(12) United States Patent
Lancaster, III et al.

(10) Patent No.: US 8,979,466 B2
(45) Date of Patent: *Mar. 17, 2015

(54) METHODS AND APPARATUSES FOR LOADING AND UNLOADING BY PALLET TRUCK

(75) Inventors: Patrick R. Lancaster, III, Louisville, KY (US); Philip R. Moore, Mt. Washington, KY (US); Richard L. Johnson, La Grange, KY (US)

(73) Assignee: Lantech.com, LLC, Louisville, KY (US)

( * ) Notice: Subject to any disclaimer, the term of this patent is extended or adjusted under 35 U.S.C. 154(b) by 829 days.

This patent is subject to a terminal disclaimer.

(21) Appl. No.: 12/729,942

(22) Filed: Mar. 23, 2010

(65) Prior Publication Data

US 2010/0239403 A1 Sep. 23, 2010

Related U.S. Application Data

(60) Provisional application No. 61/202,653, filed on Mar. 23, 2009.

(51) Int. Cl.
| | |
|---|---|
| *B66F 9/02* | (2006.01) |
| *B65B 61/28* | (2006.01) |
| *B65G 65/00* | (2006.01) |
| *B65B 11/02* | (2006.01) |
| *B65B 11/04* | (2006.01) |

(52) U.S. Cl.
CPC .............. *B65B 61/28* (2013.01); *B65B 11/025* (2013.01); *B65B 11/045* (2013.01); *B65B 2210/20* (2013.01); *B65G 65/00* (2013.01)
USPC .......................................... 414/595

(58) Field of Classification Search
USPC .......... 414/430, 595, 529, 228, 229; 119/843, 119/845, 846, 847, 848, 849; 105/436; 193/41, 38, 354, 37, 35 R; 14/69.5, 14/72.5, 71.1; 53/211
See application file for complete search history.

(56) References Cited

U.S. PATENT DOCUMENTS

| | | | | |
|---|---|---|---|---|
| 1,708,854 | A | * 4/1929 | Stahlhut | 414/353 |
| 2,889,945 | A | * 6/1959 | Holsclaw | 414/534 |
| 2,904,196 | A | 9/1959 | Teixeira | |
| 3,118,552 | A | * 1/1964 | Behr | 414/529 |
| 3,549,035 | A | * 12/1970 | Soper | 414/785 |
| 3,842,998 | A | * 10/1974 | Borum | 414/529 |
| 4,077,179 | A | * 3/1978 | Lancaster et al. | 53/441 |
| 4,102,513 | A | * 7/1978 | Guard | 242/423.1 |
| 4,131,251 | A | * 12/1978 | Lloyd et al. | 244/137.3 |
| 4,165,810 | A | * 8/1979 | Young | 414/595 |
| 4,168,771 | A | * 9/1979 | Krivec | 193/35 A |
| 4,225,279 | A | * 9/1980 | Boyer | 414/428 |

(Continued)

FOREIGN PATENT DOCUMENTS

EP 1 489 004 B1 8/2006

*Primary Examiner* — Saul Rodriguez
*Assistant Examiner* — Glenn Myers
(74) *Attorney, Agent, or Firm* — Wood, Herron & Evans, LLP

(57) ABSTRACT

An apparatus for transferring a load between a pallet truck and a load wrapping surface may include an angled ramp surface configured to support at least a portion of the pallet truck. The apparatus may also include an angled conveyor surface extending alongside at least a portion of the angled ramp surface. The angled conveyor surface may be configured to convey the load between the load wrapping surface and the angled ramp surface.

80 Claims, 38 Drawing Sheets

(56) References Cited

U.S. PATENT DOCUMENTS

| | | | |
|---|---|---|---|
| 4,344,726 A * | 8/1982 | Naffa | 410/79 |
| 4,468,915 A * | 9/1984 | Parry | 53/587 |
| 4,662,020 A * | 5/1987 | Wilkerson | 14/2.4 |
| 4,699,337 A * | 10/1987 | Lewis | 244/137.1 |
| 4,989,803 A * | 2/1991 | Lambert et al. | 242/422.4 |
| 5,005,335 A * | 4/1991 | Yourgalite et al. | 53/399 |
| 5,013,206 A * | 5/1991 | Ernst et al. | 414/483 |
| 5,054,987 A | 10/1991 | Thornton | |
| 5,056,653 A | 10/1991 | Lancaster | |
| 5,078,560 A * | 1/1992 | Patrick et al. | 410/68 |
| 5,181,820 A * | 1/1993 | Sjogren et al. | 414/397 |
| 5,184,366 A * | 2/1993 | Rawdon et al. | 14/71.5 |
| 5,450,709 A * | 9/1995 | Steding | 53/465 |
| 6,070,400 A * | 6/2000 | Peeters et al. | 53/588 |
| 6,170,228 B1 * | 1/2001 | Zeman, III | 53/74 |
| 6,467,789 B1 * | 10/2002 | Schedler et al. | 280/408 |
| 7,040,071 B2 | 5/2006 | Heikaus | |
| 7,146,780 B2 * | 12/2006 | Brieden | 53/465 |
| 7,255,226 B2 * | 8/2007 | Lawless et al. | 198/782 |
| 7,435,047 B2 * | 10/2008 | Meijer | 414/785 |
| 7,524,159 B2 * | 4/2009 | Mammone et al. | 414/812 |
| 8,011,677 B1 * | 9/2011 | Ellington et al. | 280/43.12 |
| 8,075,244 B2 * | 12/2011 | Ellington | 414/814 |
| 8,376,089 B2 * | 2/2013 | Stone | 187/232 |
| 2003/0182900 A1 * | 10/2003 | Bowden et al. | 53/432 |
| 2004/0040477 A1 | 3/2004 | Neumann | |
| 2005/0138897 A1 * | 6/2005 | Lancaster et al. | 53/441 |
| 2007/0204565 A1 | 9/2007 | Lancaster, III et al. | |
| 2011/0023419 A1 * | 2/2011 | Lancaster et al. | 53/461 |

\* cited by examiner

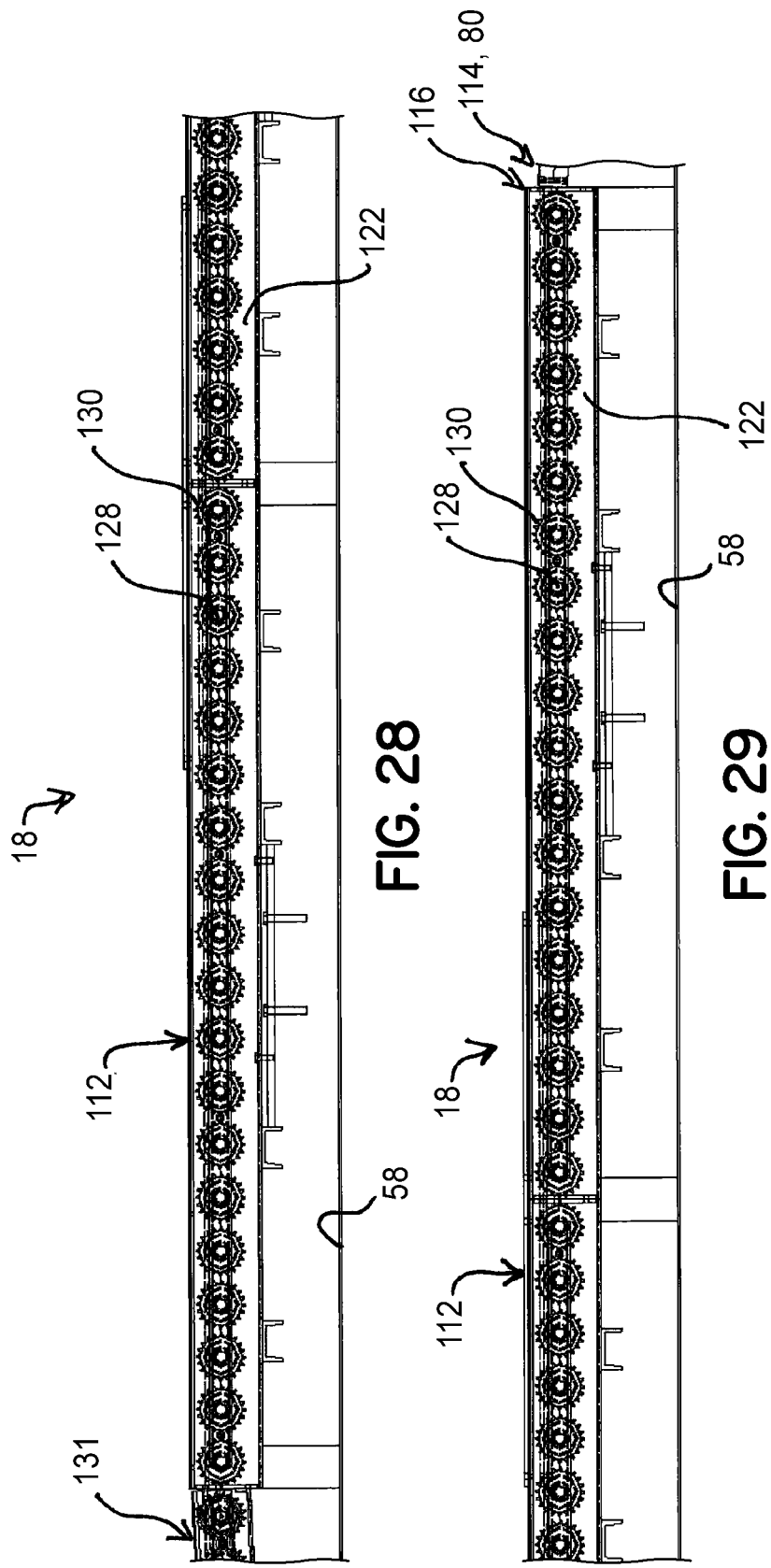

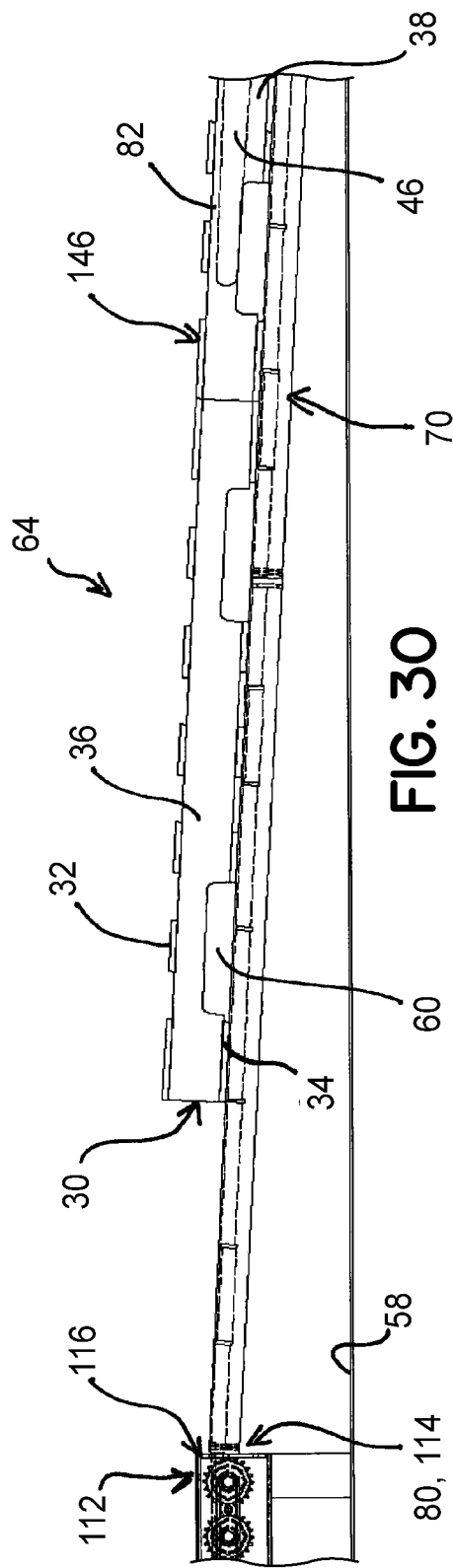
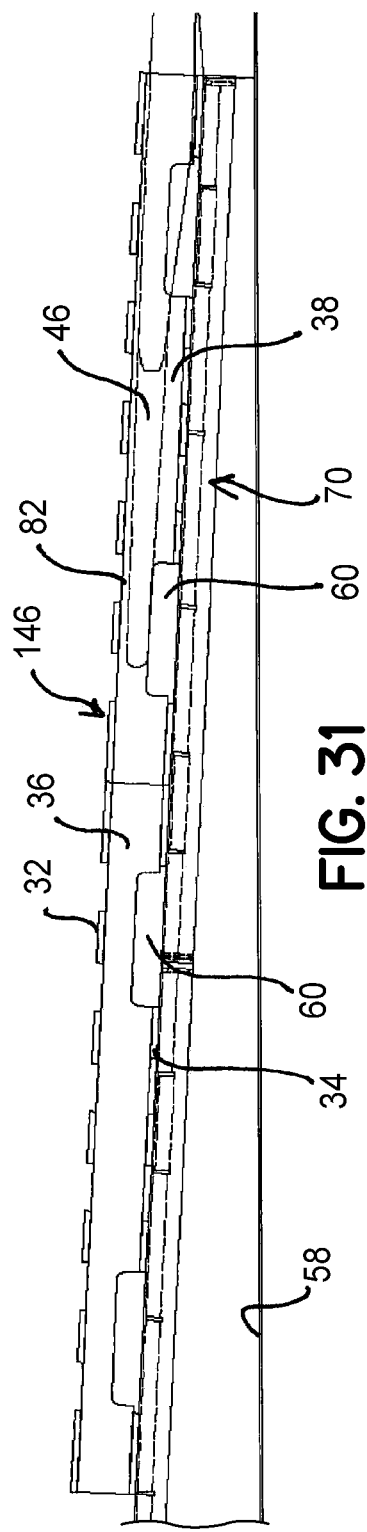

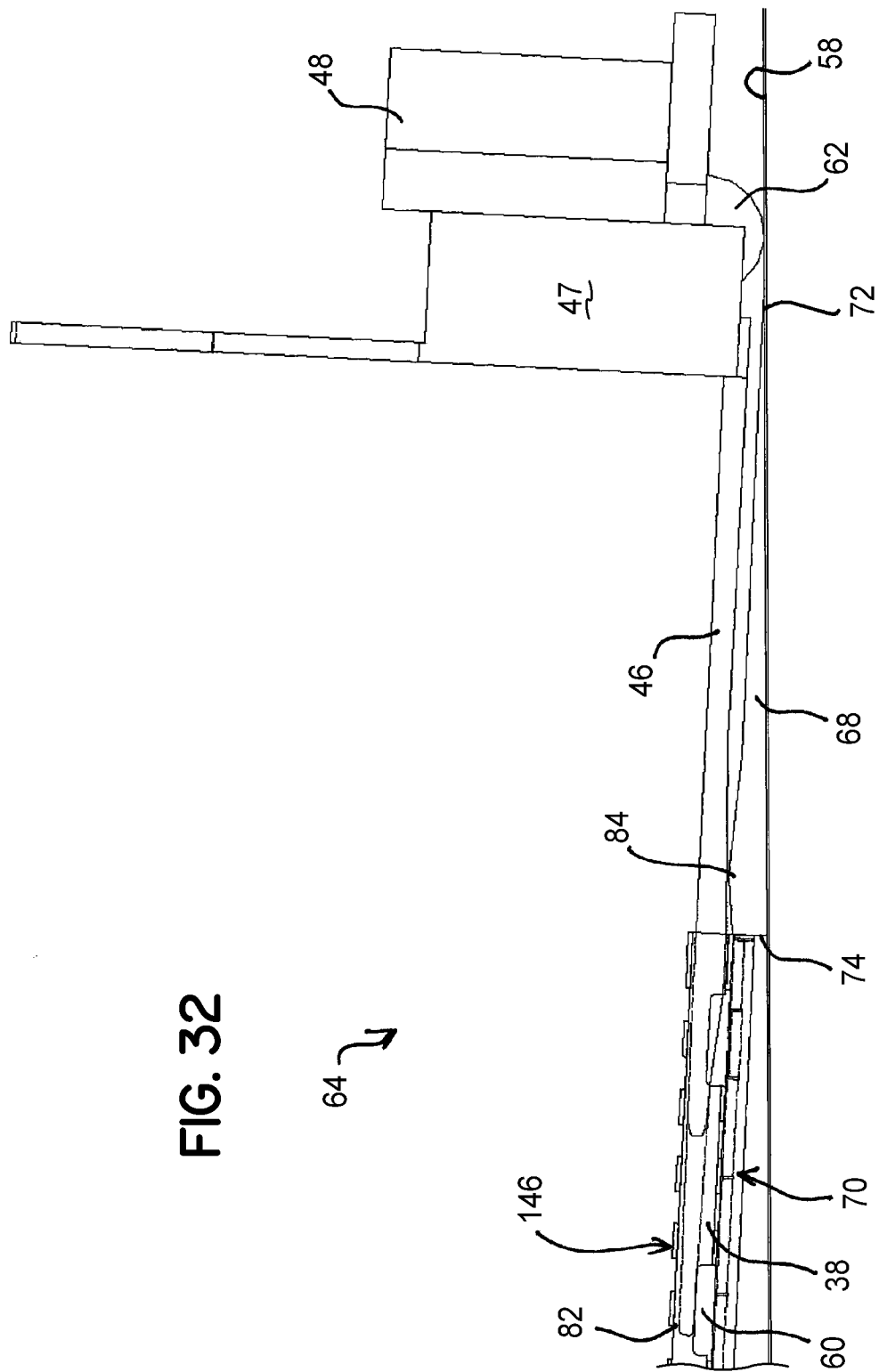

METHODS AND APPARATUSES FOR LOADING AND UNLOADING BY PALLET TRUCK

This application claims priority under 35 U.S.C. §119 based on U.S. Provisional Application No. 61/202,653, filed Mar. 23, 2009, the complete disclosure of which is incorporated herein by reference.

TECHNICAL FIELD

The present disclosure relates to an apparatus and method for conveying loads, and more particularly, to a conveyor assembly for use with pallet trucks.

BACKGROUND

Distribution centers use relatively common processes to pick products and load trucks with those products, for delivery to other locations. These products are typically stacked or otherwise arranged to form a load. The products may be placed on a pallet, forming a palletized load. A pallet is normally constructed with a top plate and at least a partial bottom plate. For example, the bottom plate may include a plurality of boards spaced apart from one another. The bottom plate supports the palletized load when it is stacked on top of another load. Pallets are preferably constructed of wood, but alternatively may be made of plastic. Plastic pallets generally have a series of "legs" rather than a bottom plate. The pallets are typically constructed to industry standards. Sometimes, pallets may be leased from a pallet supplier.

A palletized load can be carried on tines of a fork of a pallet truck. The tines are cantilevered off of the pallet truck, but may include retractable wheels on or near their distal ends. When retracted, the retractable wheels may be contained within the tines or otherwise flush with the external surfaces of the tines. With the retractable wheels in their retracted positions, the tines of the fork can be more easily inserted into and extracted from tunnels or holes located between the top and bottom plates of the pallet. After the tines are inserted through the tunnels, the retractable wheels may be, for example, hydraulically lowered. As the retractable wheels pass through openings in the bottom plate of the pallet and engage the ground, a lifting force is exerted on the top plate of the pallet by the tines of the fork, thus raising the palletized load off of the ground. When the palletized load is ready for dropping off, the retractable wheels are retracted, causing the tines of the fork to lower, thus lowering the palletized load toward the ground.

Often times, palletized loads are wrapped for transportation, storage, containment, stabilization, protection, and waterproofing. Various packaging techniques and wrapping apparatuses have been used to wrap palletized loads. One system uses stretch wrapping machines to stretch, dispense, and wrap stretch packaging material around a palletized load. Stretch wrapping can be performed as an inline automated packaging technique which dispenses and wraps packaging material in a stretched condition around products arranged on a pallet to cover and contain the products. Stretch wrapping, whether accomplished by turntable, rotating arm, or rotating ring, typically covers the vertical sides of the palletized load with a stretchable film such as polyethylene film. In each of these arrangements, relative rotation is provided between the palletized load and a packaging material dispenser to wrap packaging material about the sides of the palletized load.

Palletized loads must somehow be transported to the wrapping apparatus, and then placed in a wrapping area of the wrapping apparatus. In order to increase efficiency and reduce the number of bottlenecks, conventional conveyors may be used to transport unwrapped palletized loads to the wrapping areas of the wrapping apparatuses. By using conveyors, pallet trucks can be more efficient since they can drop loads off at the conveyor and then leave to pick up other loads, allowing the conveyor to transport waiting loads to a wrapping area. Using conventional conveyors, however, may present problems. One problem is that pallet trucks are unable to lift the unwrapped palletized loads high enough to place them onto conventional above-floor conveyors. Conveyors with lift tables or elevators are available to automate the process. However, such devices require a large amount of space and are mechanically complex and costly to maintain. In addition, conveyors have been placed in pits created in the floor to lower the conveyor to be approximately level with the floor. This requires a large amount of space and the permanent destruction of the floor. In addition, such a process is costly.

Ramp type solutions, including those having a ramp leading up to a level conveyor, have not proven feasible due to the type of lift mechanisms found on pallet trucks. The tines of a pallet truck fork are typically around 3 inches thick, and occupy most of the space between the top and bottom plates of pallets (the space being around 3.5 to 4.5 inches, typically). When a pallet truck's front wheels are retracted to assist with extraction of the tines from a pallet's tunnels, the bottom surfaces of the tines will lower. If the fork is lowered to place a palletized load on a level conveyor while the pallet truck is on a ramp, the lowering of the tines can cause the tines to wedge against the top and/or bottom plates of the pallet in the pallet's tunnels, thus binding the tines to the pallet, due at least in part to misalignment between the tines and the surface of the level conveyor. FIG. 1 shows a fork in various stages of insertion into a pair of pallets. The fork begins to wedge against the top plates of the pallets as it is partially inserted. The position of the fork at partial insertion is represented in FIG. 1 by the tip portion of the fork on the right (near where the pallets meet). Wedging continues as insertion progresses to full insertion of the fork. The position of the fork at full insertion is represented in FIG. 1 by the tip portion of the fork on the left (near a middle section of the leftmost pallet). Accordingly, due to the widespread use of pallet trucks, manufacturers have not been able to successfully employ either powered or non-powered conveyors to automated wrapping operations, and distribution centers have not been able to fully harness efficiency gains associated with using conveyors and automate wrapping operations.

Solutions requiring conveyor cut-outs, as demonstrated in FIG. 38, have not proven feasible for pallets with bottom plates. One reason is that as a pallet with a bottom plate is loaded onto the conveyor, the pallet truck's fork may continue down into the cutout while moving to its lowered position. This movement of the fork may break the portion of the bottom plate positioned above the cut-out, since the fork will force that portion into the cut-out while the conveyor supports the side portions of the pallet at a height higher than the cutout. Dropping the conveyor to floor-height to avoid this breaking is not desirable for at least the reasons discussed above.

In light of these drawbacks, there is a need to reduce the complexity, time, and number of material handling steps necessary to move palletized loads to and from a wrapping apparatus in a simple, reliable, and inexpensive manner.

SUMMARY

According to one aspect of the present disclosure, an apparatus for transferring a load between a pallet truck and a load wrapping surface is provided. The apparatus may include an angled ramp surface configured to support at least a portion of the pallet truck. The apparatus may also include an angled conveyor surface extending alongside at least a portion of the angled ramp surface. The angled conveyor surface may be configured to convey the load between the load wrapping surface and the angled ramp surface.

According to another aspect of the present disclosure, an apparatus for transferring a load between a conveyor surface and a pallet truck is provided. The apparatus may include an angled, non-conveyor portion configured to support a pallet truck. The apparatus may also include an angled, conveyor portion configured to support a load. The non-conveyor portion may extend at least partially into the conveyor portion to merge with the conveyor portion. The angle of the non-conveyor portion may be substantially equal to the angle of the conveyor portion at the merging point.

According to yet another aspect of the present disclosure, an apparatus for loading and unloading a conveyorized wrapping apparatus with a pallet truck may be provided. The apparatus may include an angled ramp surface to be positioned on a support surface. The apparatus may also include an angled conveyor surface outboard of the angled ramp surface. The angle, with respect to the support surface, of at least a portion of the angled ramp surface configured to be contacted by a drive wheel of the pallet truck may be substantially equal to the angle, with respect to the support surface, of the conveyor surface. The angle of the angled ramp surface and the angle of the angled conveyor surface may cause a fork of the pallet truck and a pallet resting on the conveyor surface to be positioned such that binding between the fork and the pallet does not occur as the fork is inserted into and extracted from holes in the pallet.

According to yet another aspect of the present disclosure, a method of transferring a palletized load from a pallet truck to an angled conveyor surface is provided. The method may include moving the pallet truck onto an angled ramp surface to position the palletized load above the angled conveyor surface. The method may also include lowering a fork of the pallet truck to rest the palletized load on the angled conveyor surface. The method may further include keeping the fork of the pallet truck free from binding engagement with the pallet supporting the load while extracting the fork from tunnels between a top plate and a bottom plate of the pallet.

According to yet another aspect of the present disclosure, a method of transferring a load from an angled conveyor surface to a pallet truck is provided. The method may include moving the pallet truck onto an angled ramp surface. The method may also include inserting a fork of the pallet truck into tunnels between a top plate and a bottom plate of a pallet at the bottom of the load, while the load rests on the angled conveyor surface. The method may also include keeping the fork free from binding engagement with the pallet while inserting the fork into the tunnels by engaging the fork with at least a portion of the angled ramp surface. The method may also include raising the fork to lift the load off the angled conveyor surface.

According to yet another aspect of the present disclosure, a method of transferring a palletized load from a pallet truck to an angled conveyor surface may be provided. The method may include moving the pallet truck into a position in which tines of a fork of the pallet truck, supporting the palletized load, are positioned above and substantially parallel to the angled conveyor surface. The method may also include lowering the tines of the pallet truck to rest the palletized load on the angled conveyor surface. The method may further include removing the tines of the pallet truck from a pallet supporting the palletized load.

According to yet another aspect of the present disclosure, a method of transferring a wrapped palletized load from an angled conveyor surface to a pallet truck is provided. The method may include moving the pallet truck into a position in which tines of a fork of the pallet truck are substantially parallel to the angled conveyor surface. The method may also include inserting the tines of the pallet truck into a pallet supporting the wrapped palletized load, wherein the tines are substantially parallel to the angled conveyor surface for at least one portion of the insertion. The method may further include raising the tines to lift the wrapped palletized load off of the angled conveyor surface.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

FIG. 28 shows a side view of a central portion of the conveyor assembly of FIG. 25, according to an aspect of the present disclosure.

FIG. 29 shows a side view of another central portion of the conveyor assembly of FIG. 25, according to an aspect of the present disclosure.

FIG. 30 shows a side view of an intermediate portion of the conveyor assembly of FIG. 25 supporting a plurality of pallets, according to an aspect of the present disclosure.

FIG. 31 shows a side view of another intermediate portion of the conveyor assembly of FIG. 25 with pallets positioned thereon, according to an aspect of the present disclosure.

FIG. 32 shows a side view of an end portion of the conveyor assembly of FIG. 25 with the pallet truck used to place and remove pallets from the conveyor, according to an aspect of the present disclosure.

DESCRIPTION OF THE EMBODIMENTS

Figure 1:
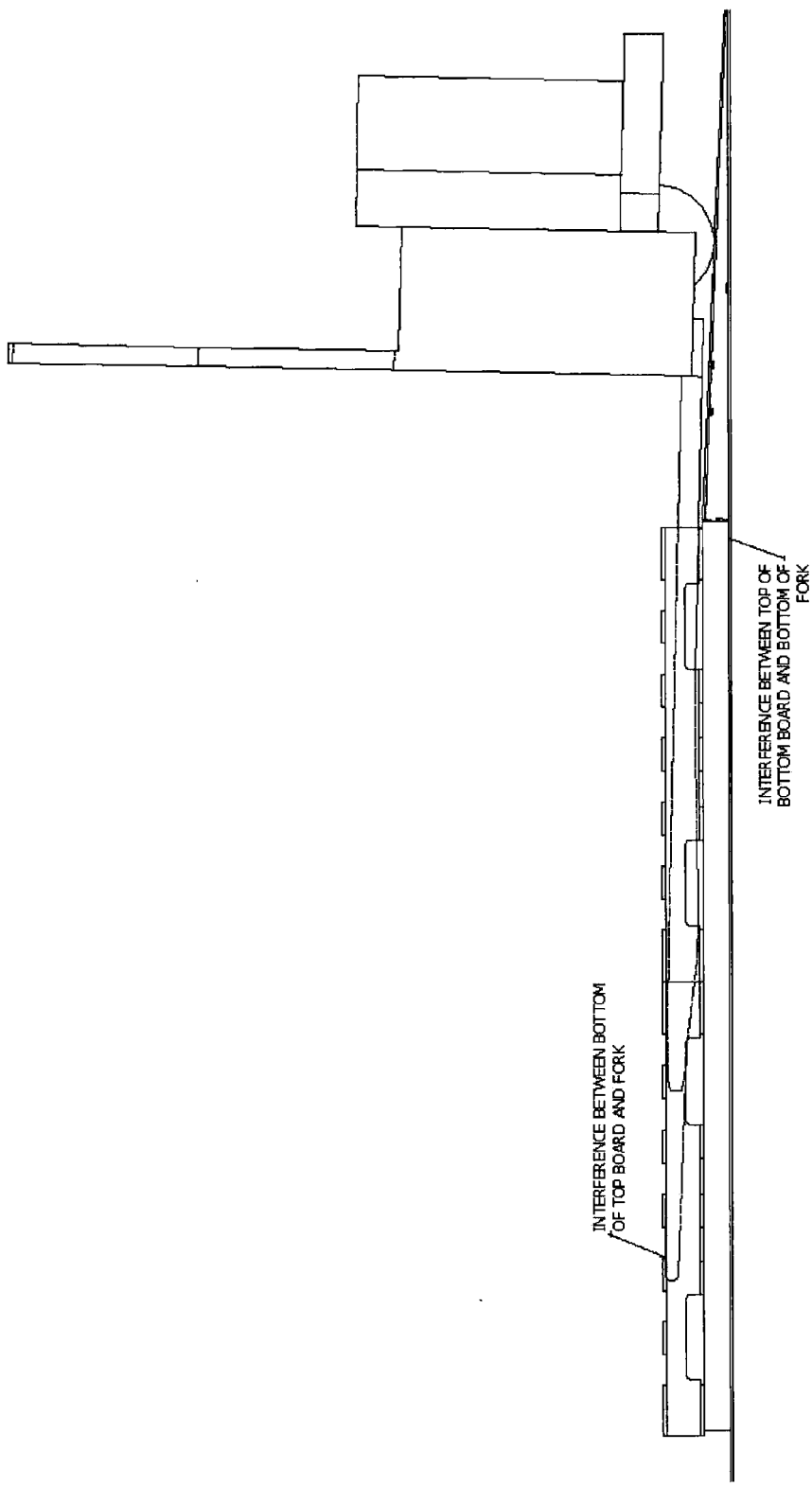
FIG. 1 shows a side view of a conventional pallet truck and conveyor.

Reference will now be made in detail to the present exemplary embodiments of the disclosure, examples of which are illustrated in the accompanying drawings. Wherever possible, the same reference numbers will be used throughout the drawings to refer to the same or like parts.

The present disclosure is related to a conveyorized wrapping system and method for wrapping and conveying loads. Features of the conveyorized wrapping system are described generally here, and are described in greater detail further below. The conveyorized wrapping system may include a conveyor assembly with three areas: an infeed area, a wrapping area, and an outfeed area. An unwrapped palletized load may be dropped off at the infeed area by a pallet truck. The pallet truck may include a movable fork that is inserted into tunnels through a pallet of the unwrapped palletized load, and is lifted and lowered to raise and lower the load. The unwrapped palletized load may be conveyed through the infeed area to the wrapping area for wrapping, after which the wrapped palletized loads may be conveyed away from the wrapping area to the outfeed area. The wrapped palletized loads may be conveyed through the outfeed area, where they may be picked up by a pallet truck and transported to another location.

The infeed area may include an infeed ramp and an infeed conveyor. The infeed ramp and the infeed conveyor may extend in an inclined manner toward the wrapping area. The infeed ramp and the infeed conveyor may be sized and configured so that a pallet truck can be driven onto the infeed ramp to position an unwrapped palletized load above the infeed conveyor, the pallet truck can lower its fork to lower the unwrapped palletized load onto the infeed conveyor, and the pallet truck can withdraw its fork from the pallet of the unwrapped palletized load without binding with or wedging against portions of the pallet. The infeed conveyor may convey the unwrapped palletized load to the wrapping area for wrapping.

Binding between the pallet and the fork may be avoided by providing a clearance between the fork, and top and/or bottom plates the pallet. For example, a clearance may exist between the top surface of the fork and the lower surface of the top plate of the pallet once the palletized load is lowered onto the infeed conveyor. The clearance may make it easier to extract the fork from the tunnels as the pallet truck is backed away from the palletized load. Angles for the infeed ramp and the infeed conveyor may be selected to produce the clearance.

For example, making the angle of incline of the top surface of the infeed ramp substantially equal to the angle of incline of a conveyor surface of the infeed conveyor may produce the desired clearance. This is because the fork may remain substantially parallel with the top surface of the infeed ramp, the conveyor surface of the infeed conveyor, and/or the top and bottom plates of the pallet, during lowering of the palletized load. This substantially parallel arrangement between the parts may be maintained as the fork comes to rest on the bottom plate of the pallet, producing the desired clearance between the top surface of the fork and the top plate of the pallet. The substantially parallel arrangement may be further maintained, at least initially, as the pallet truck is backed away from the palletized load to extract the fork from the tunnels of the pallet, since a drive wheel assembly of the pallet truck will remain on the infeed ramp during at least the initial portion of the extraction step. It is also contemplated that the parts may be slightly non-parallel, so long as they are positioned such that at least some clearance is provided between the fork and the top and/or bottom plates of the pallet for the extraction step.

The amount of clearance may change when the drive wheel assembly of the pallet truck leaves the infeed ramp and passes onto a support surface, such as the ground. At this point, the angle of the fork will change due to the difference between the angle of the support surface relative to the angle of the top and/or bottom plates of the pallet positioned on the conveyor surface of the infeed conveyor. As the angle of the fork changes, the amount of clearance may change. The angle of incline of the infeed ramp, the angle of incline of the infeed conveyor, and their dimensions, may be selected to prevent binding of the fork with the pallet, even when the pallet truck passes onto the support surface, by providing a sufficient clearance between the fork and the top and/or bottom plates during this phase of the extraction. The infeed ramp may also include a protrusion sized and configured to engage the bottom surface of the fork so that the fork does not damage the bottom plate of the pallet as the tips of the fork exits from the tunnels of the pallet. The infeed ramp may also include a stop on its top surface to abut a portion of the pallet truck to ensure that the pallet truck is positioned correctly when driven onto the infeed ramp.

The outfeed area may include an outfeed ramp and an outfeed conveyor for receiving a wrapped palletized load from the wrapping area. The outfeed ramp and the outfeed conveyor may extend in an inclined manner toward the wrapping area. The outfeed ramp and the outfeed conveyor may be sized and configured so that a pallet truck can be driven onto the outfeed ramp, and a fork of the pallet truck can be inserted into the pallet of the wrapped palletized load without binding with or wedging against portions of the pallet. After insertion, the pallet truck may lift the wrapped palletized load and drive away from the outfeed area to deliver the wrapped palletized load to another location.

Binding between the pallet and the fork may be avoided by providing a clearance between the fork, and top and/or bottom plates the pallet. For example, a clearance may exist between the top surface of the fork and the lower surface of the top plate of the pallet while the fork of the pallet truck is being inserted into the tunnels of the pallet. The clearance may make it easier to insert the fork into the tunnels as the pallet truck is driven up the outfeed ramp and toward the palletized load. Angles for the outfeed ramp and the outfeed conveyor may be selected to produce the clearance. For example, making the angle of incline of the top surface of the outfeed ramp substantially equal to the angle of incline of a conveyor surface of the outfeed conveyor may produce the desired clearance. This is because the fork may remain substantially parallel with the top surface of the outfeed ramp, the conveyor surface of the outfeed conveyor, and/or the top and bottom plates of the pallet, during at least a portion of the insertion of the fork. It is also contemplated that the parts may be slightly non-parallel, so long as they are positioned such that at least some clearance is provided between the fork and the top and/or bottom plates of the pallet for the insertion step.

The amount of clearance may change when the drive wheel assembly of the pallet truck leaves the ground or support surface and drives onto the outfeed ramp. For example, during a portion of the insertion where the drive wheel assembly is on the support surface, the clearance between the fork of the pallet truck and the top and/or bottom plates of the pallet may be smaller than during the portion of the insertion where the drive wheel assembly is on the outfeed ramp. The angle of incline of the outfeed ramp, the angle of incline of the outfeed conveyor, and their dimensions, may be selected to prevent binding of the fork with the pallet even when the fork of the pallet truck is being inserted into the tunnels of the pallet with the drive wheel assembly of the pallet truck on the support surface. The outfeed ramp may also include a protrusion sized and configured to engage the bottom surface of the fork so that the fork does not damage the bottom plate of the pallet as the tips of the fork enters the tunnels of the pallet. The outfeed ramp may also include a stop on its top surface to abut a portion of the pallet truck to ensure that the pallet truck is positioned correctly when driven onto the outfeed ramp. According to the present disclosure, the infeed ramp and infeed conveyor may be provided as an integral unit or as separate pieces. They may be used with or without a corresponding outfeed ramp and outfeed conveyor.

FIGS. 2-32 and 35-37 show an exemplary embodiment of a conveyorized wrapping system 10. Conveyorized wrapping system 10 may include a wrapping apparatus 12 and a conveyor assembly 14.

Figure 2:
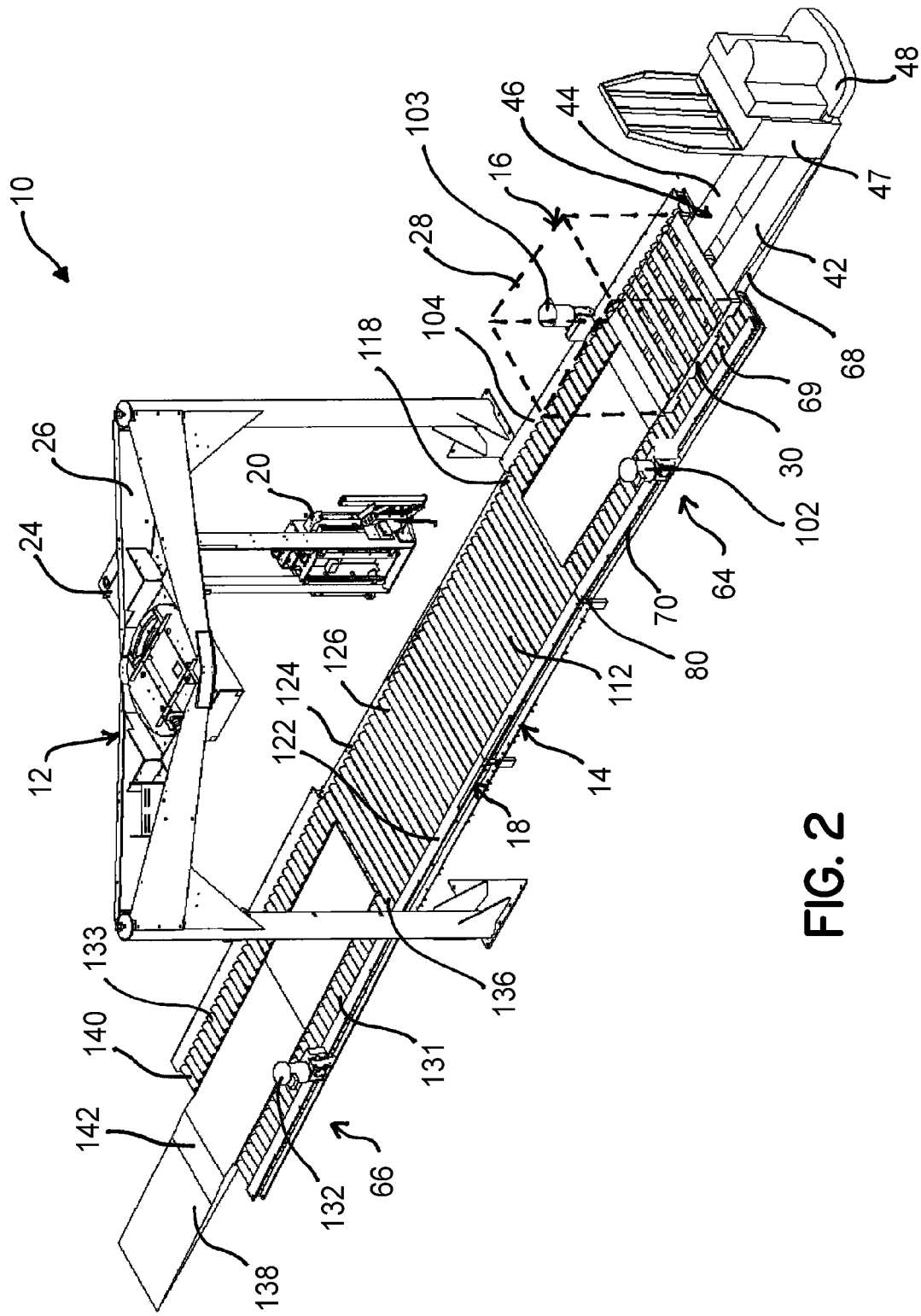
FIG. 2 shows an isometric view of a conveyorized wrapping system and a pallet truck, according to an aspect of the present disclosure.
Figure 3:
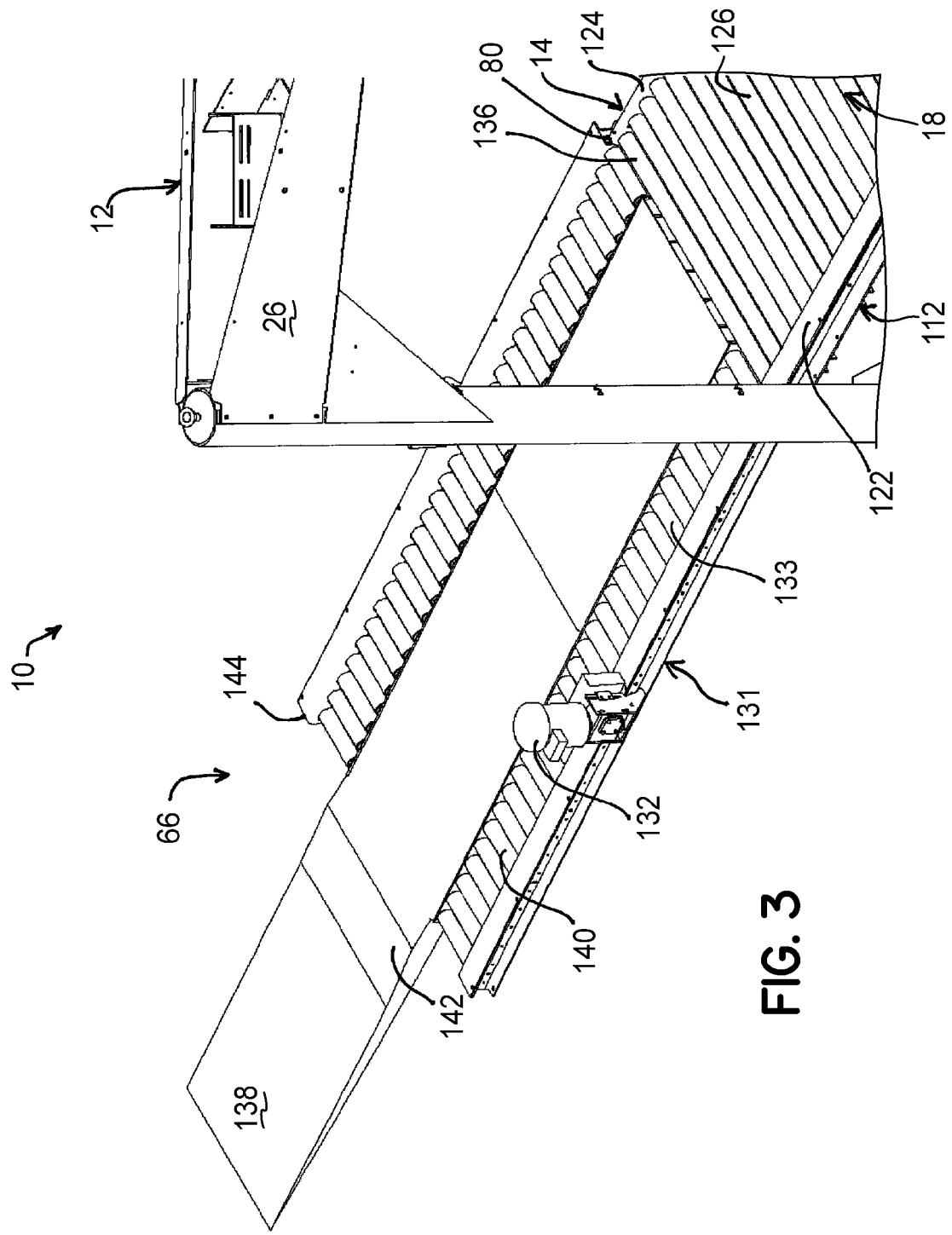
FIG. 3 shows an isometric view of an output portion of the conveyorized wrapping system of FIG. 2, according to an aspect of the present disclosure.
Figure 4:
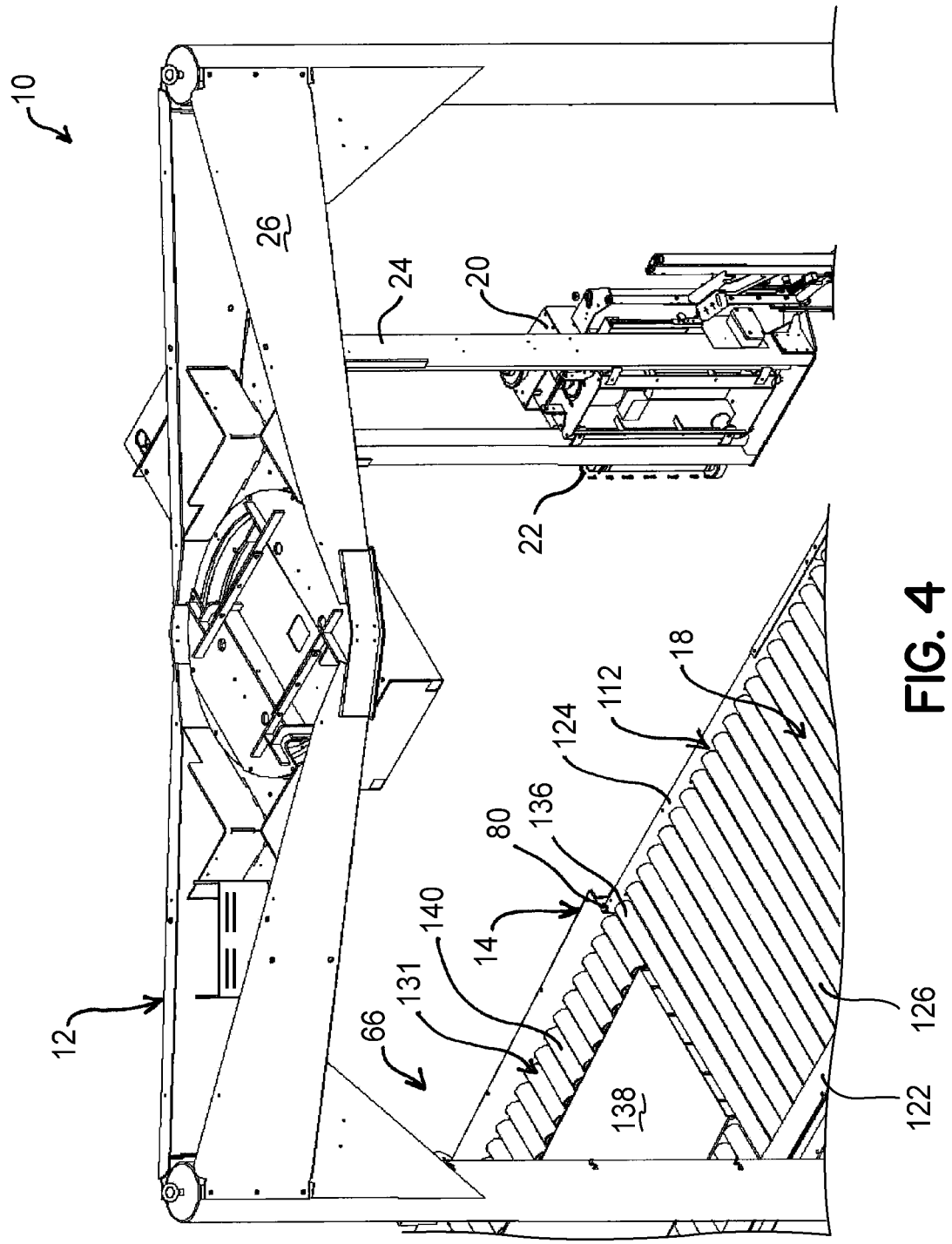
FIG. 4 shows an isometric view of an intermediate portion of the conveyorized wrapping system of FIG. 2, according to an aspect of the present disclosure.
Figure 5:
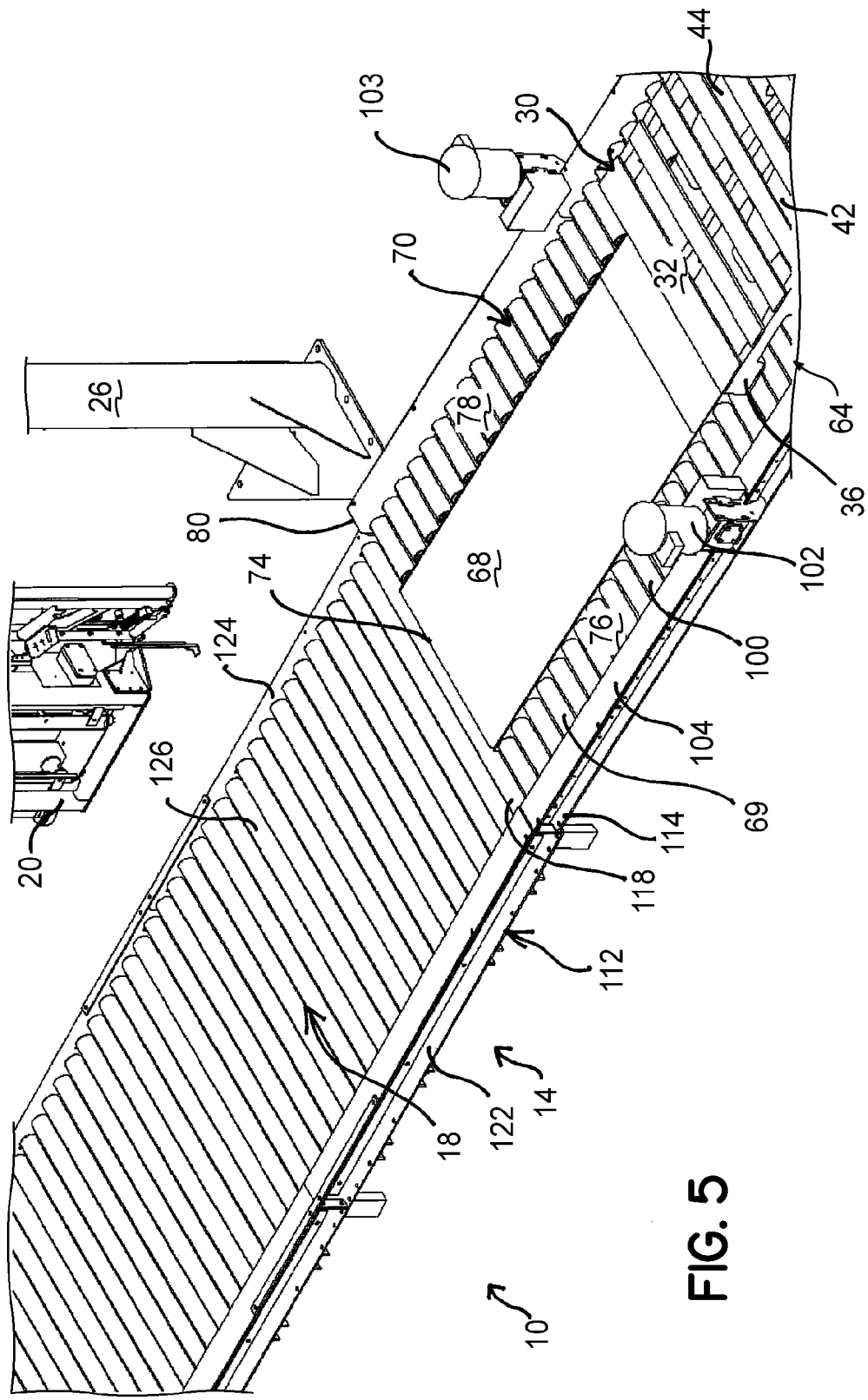
FIG. 5 shows an isometric view of another intermediate portion of the conveyorized wrapping system of FIG. 2, according to an aspect of the present disclosure.
Figure 6:
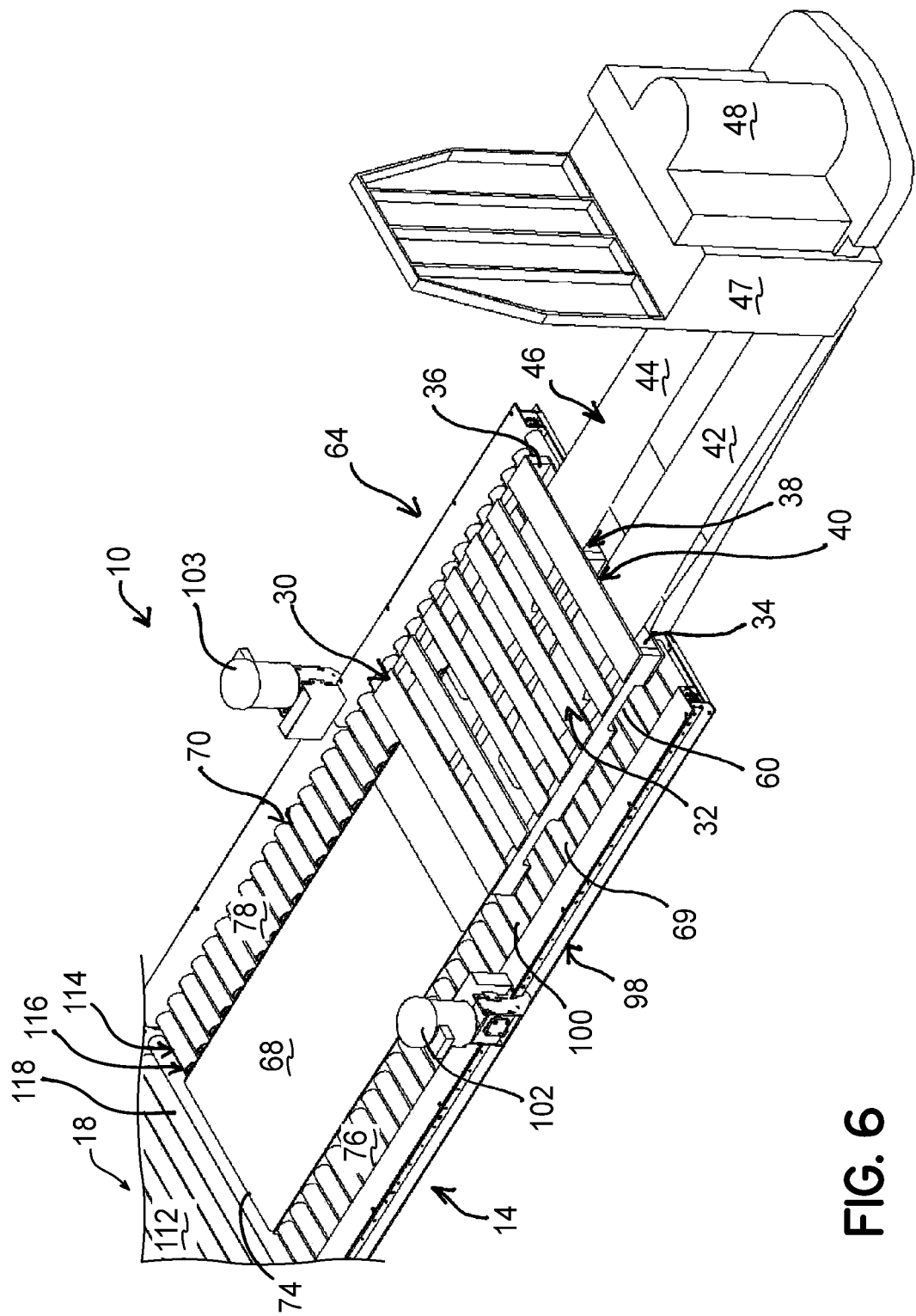
FIG. 6 shows an isometric view of an infeed portion of the conveyorized wrapping system and the pallet truck of FIG. 2, according to an aspect of the present disclosure.
Figure 7:
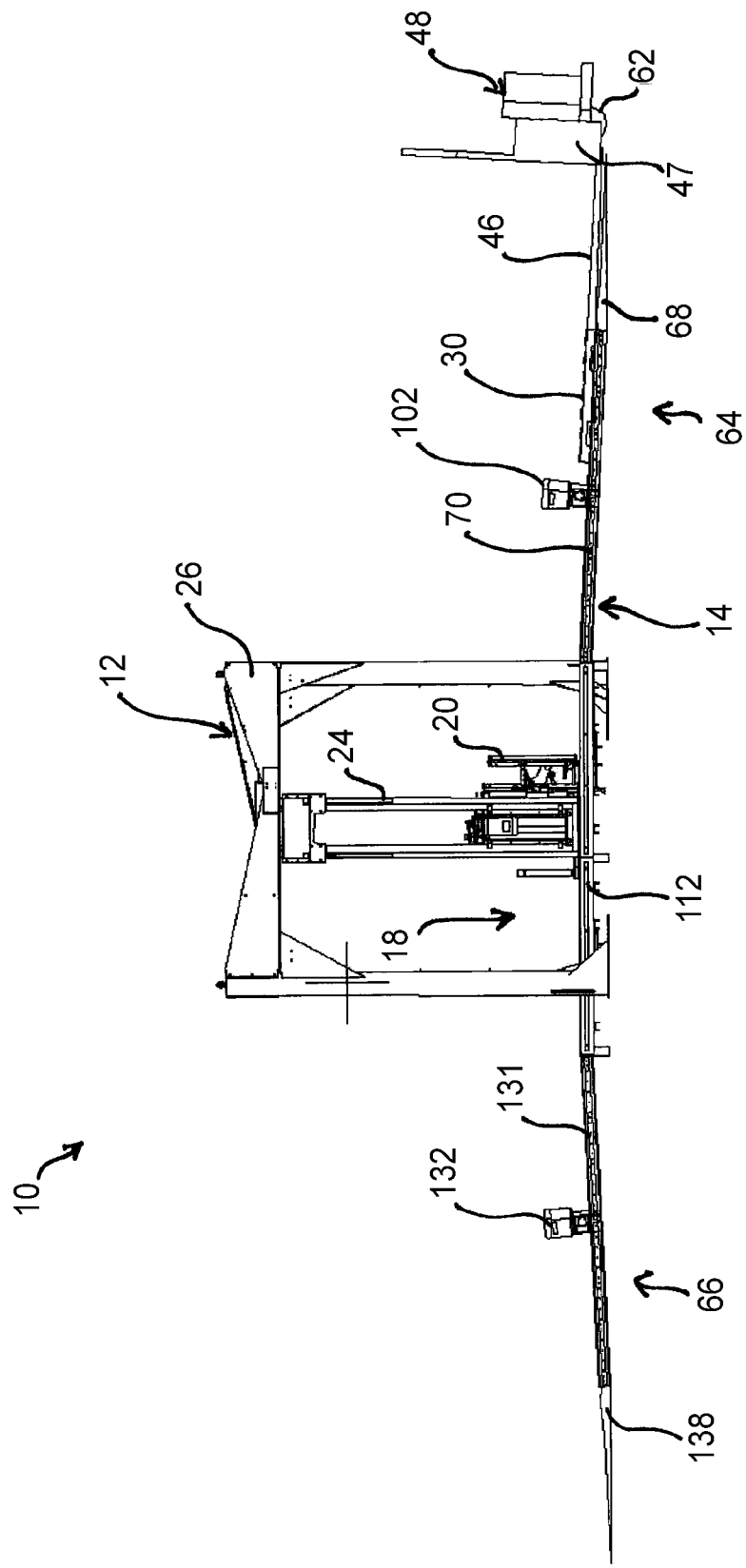
FIG. 7 shows a side view of a conveyorized wrapping system and a pallet truck, according to an aspect of the present disclosure.
Figure 8:
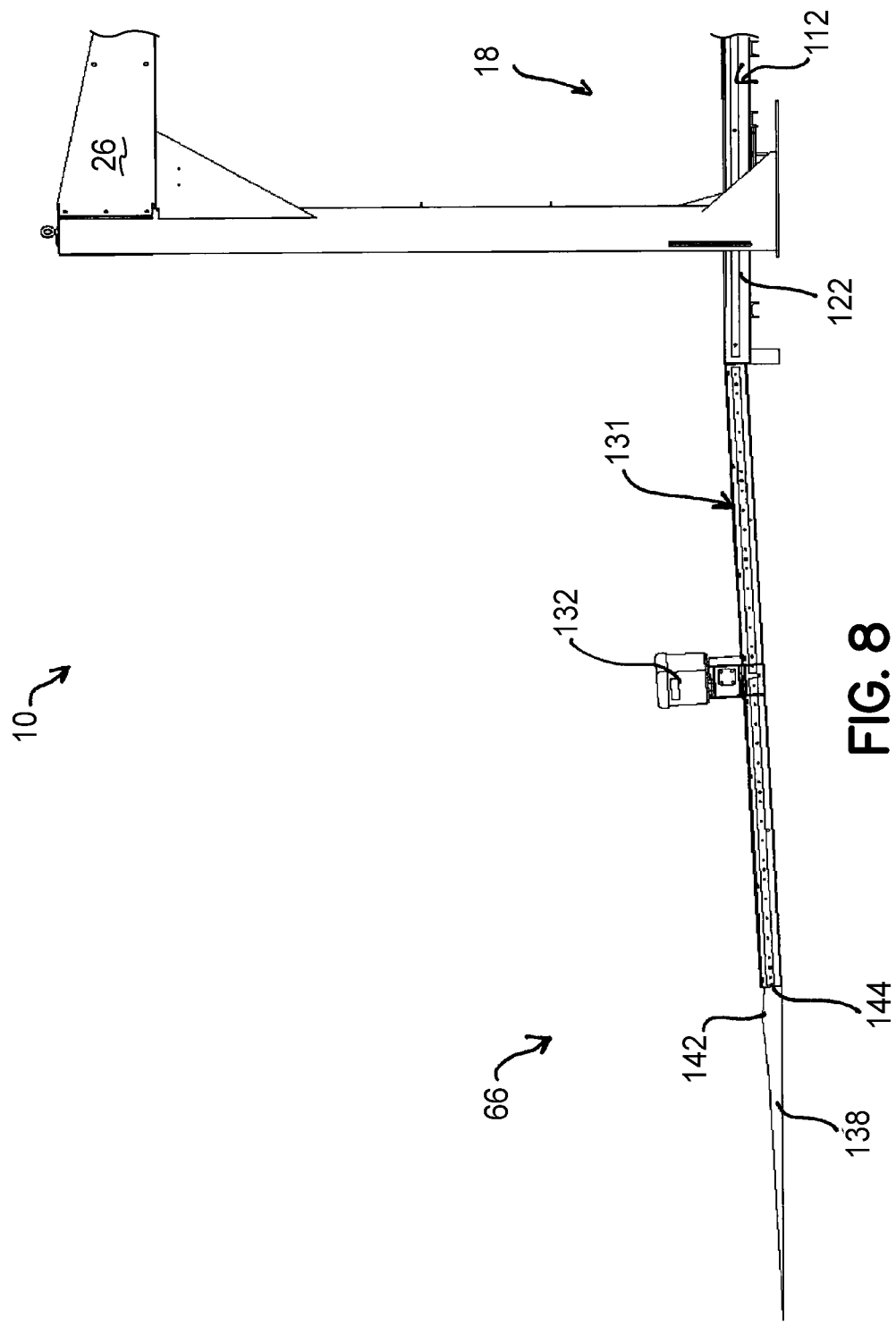
FIG. 8 shows a side view of an end portion of the conveyorized wrapping system of FIG. 7, according to an aspect of the present disclosure.
Figure 9:
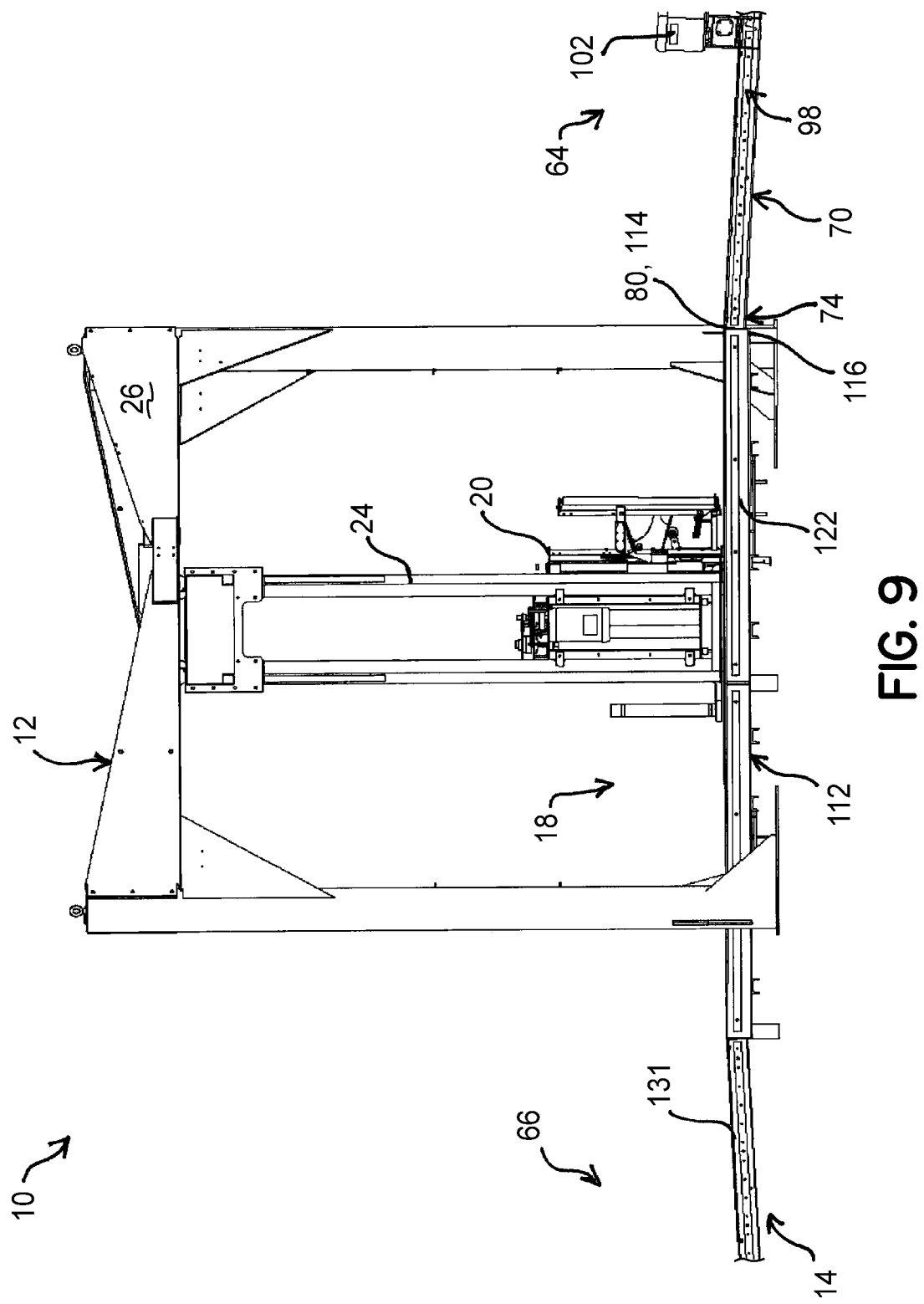
FIG. 9 shows a side view of a central portion of the conveyorized wrapping system of FIG. 7, according to an aspect of the present disclosure.
Figure 10:
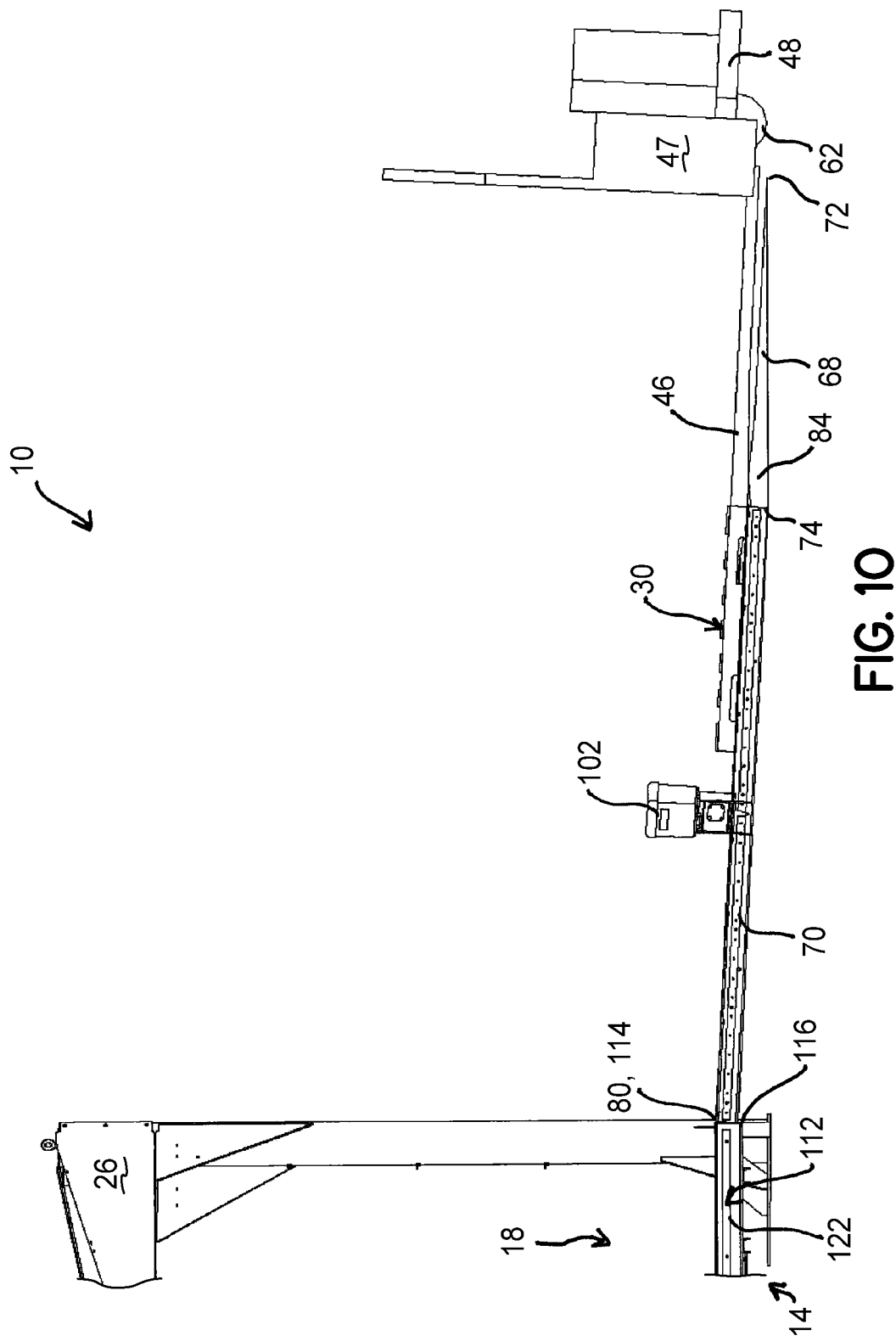
FIG. 10 shows a side view of another end portion of the conveyorized wrapping system and the pallet truck of FIG. 7, according to an aspect of the present disclosure.
Figure 11:
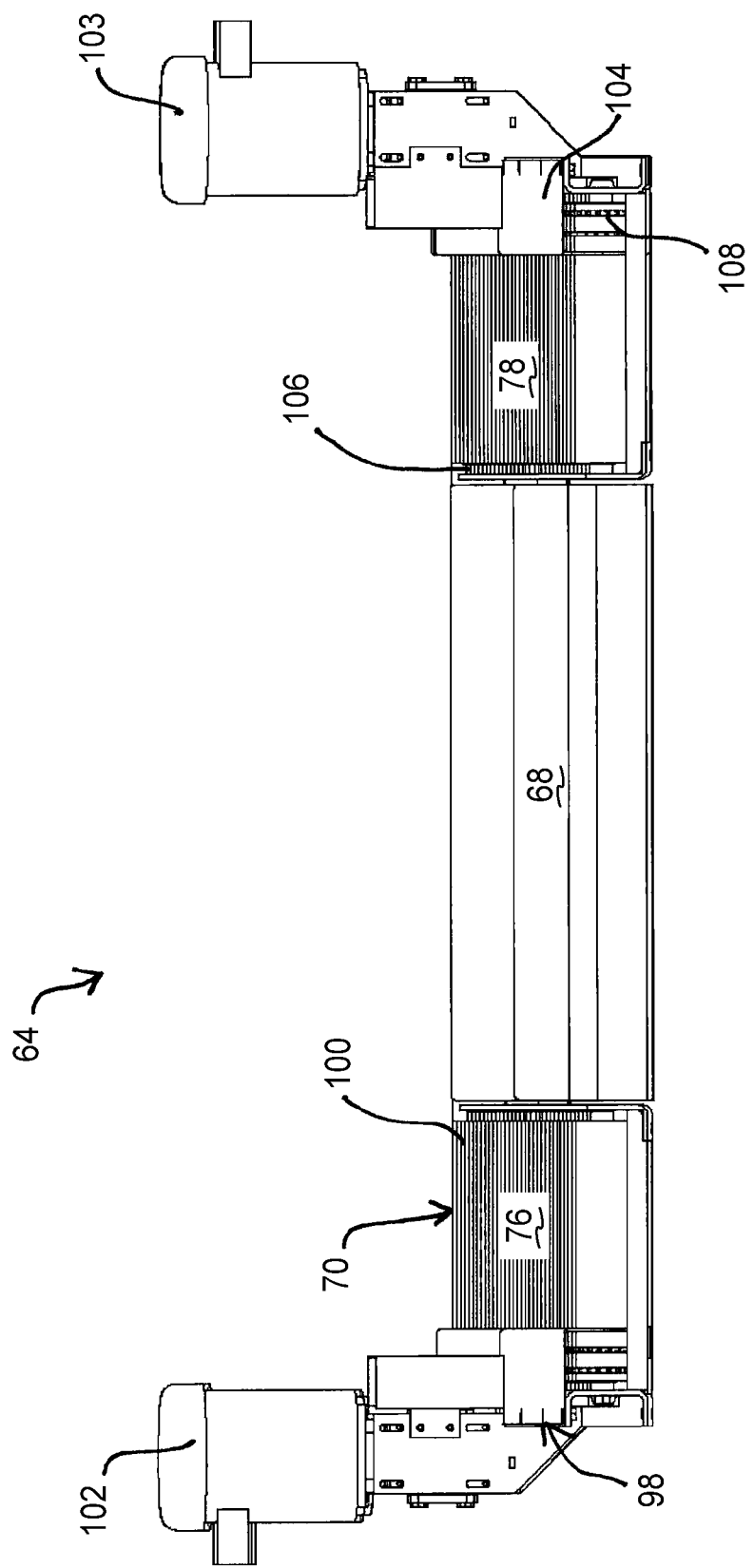
FIG. 11 shows a front view of an infeed area of a conveyorized wrapping system, according to an aspect of the present disclosure.
Figure 12:
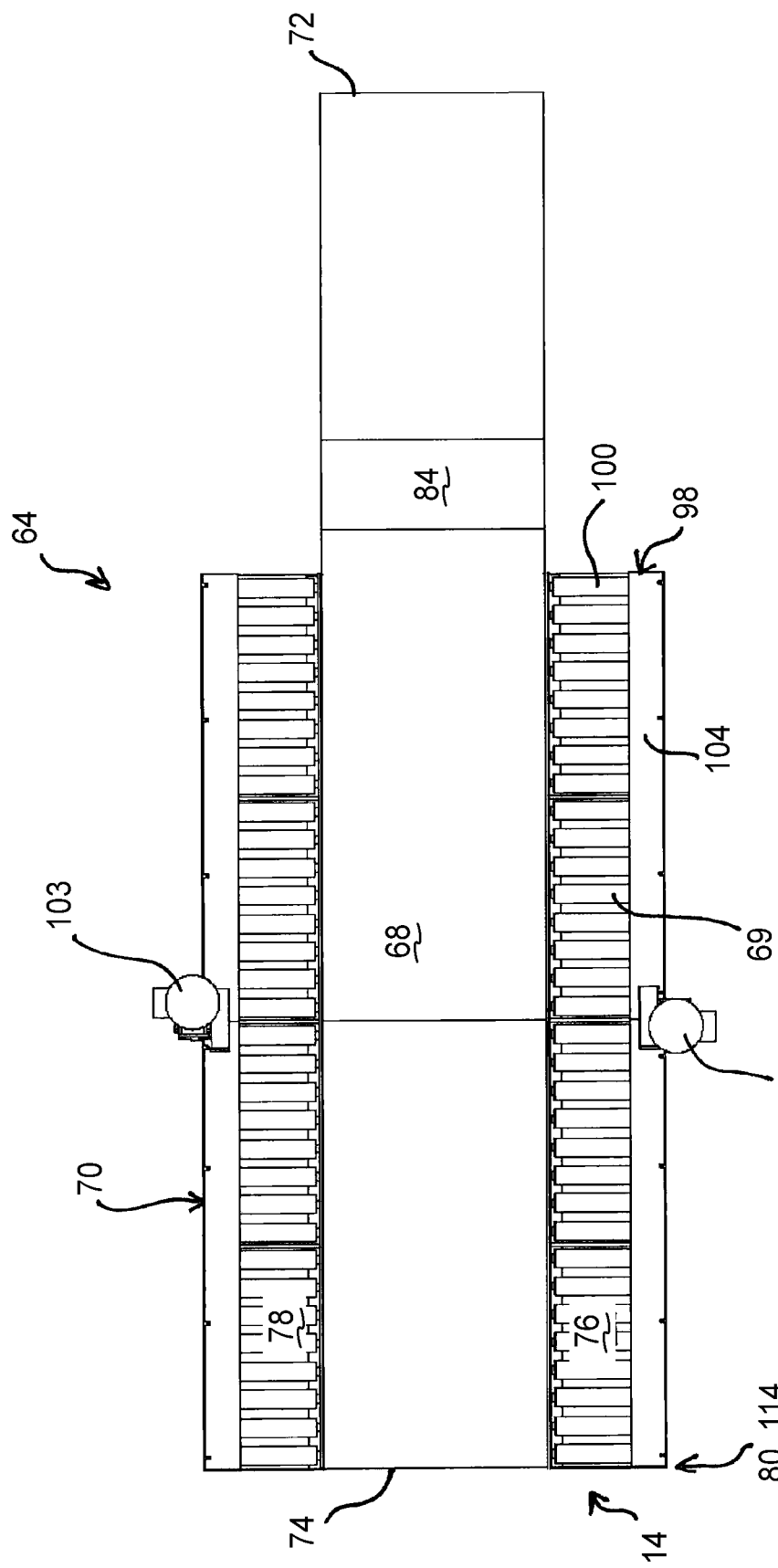
FIG. 12 shows a top view of an infeed area of a conveyorized wrapping system, according to an aspect of the present disclosure.
Figure 13:
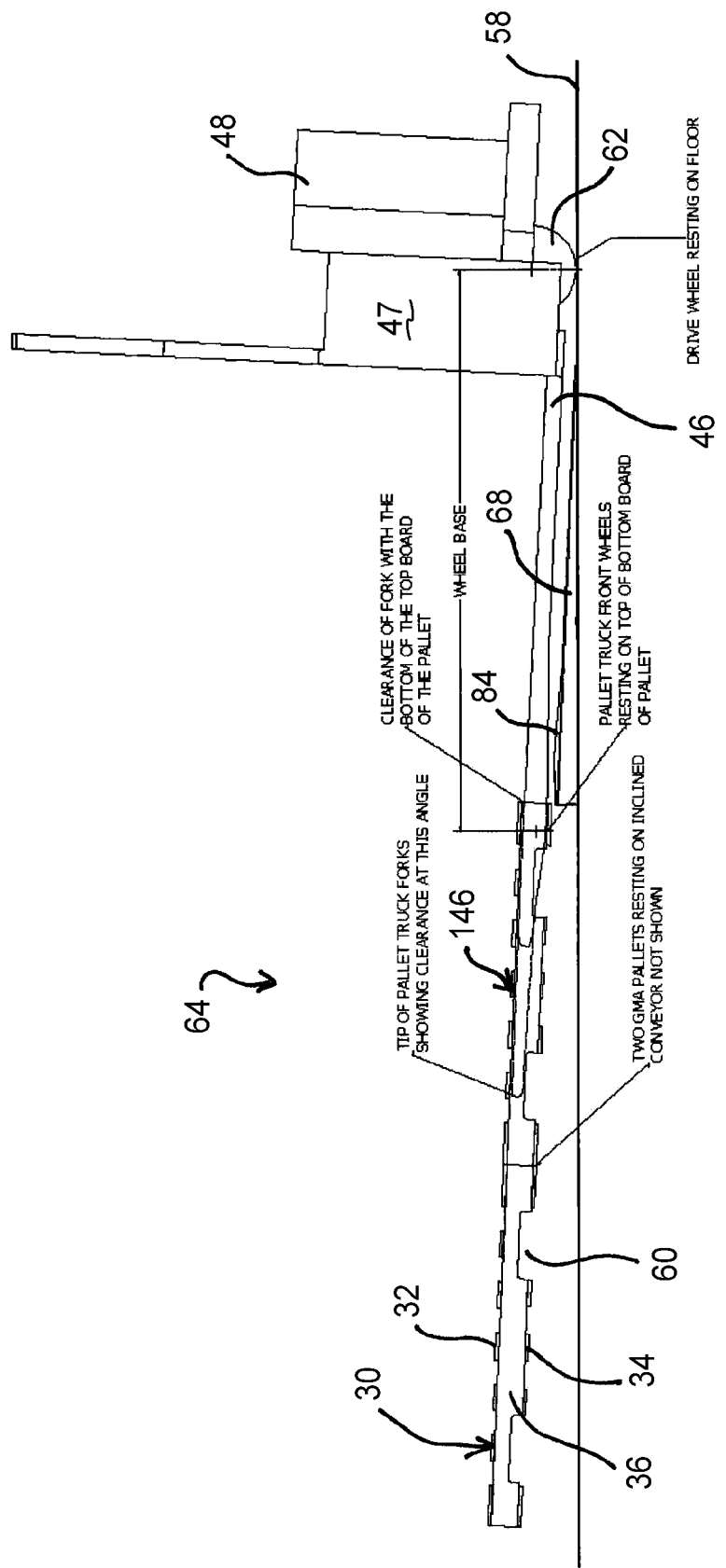
FIG. 13 shows a side view of an infeed area of a conveyorized wrapping system and a pallet truck, according to an aspect of the present disclosure.
Figure 14:
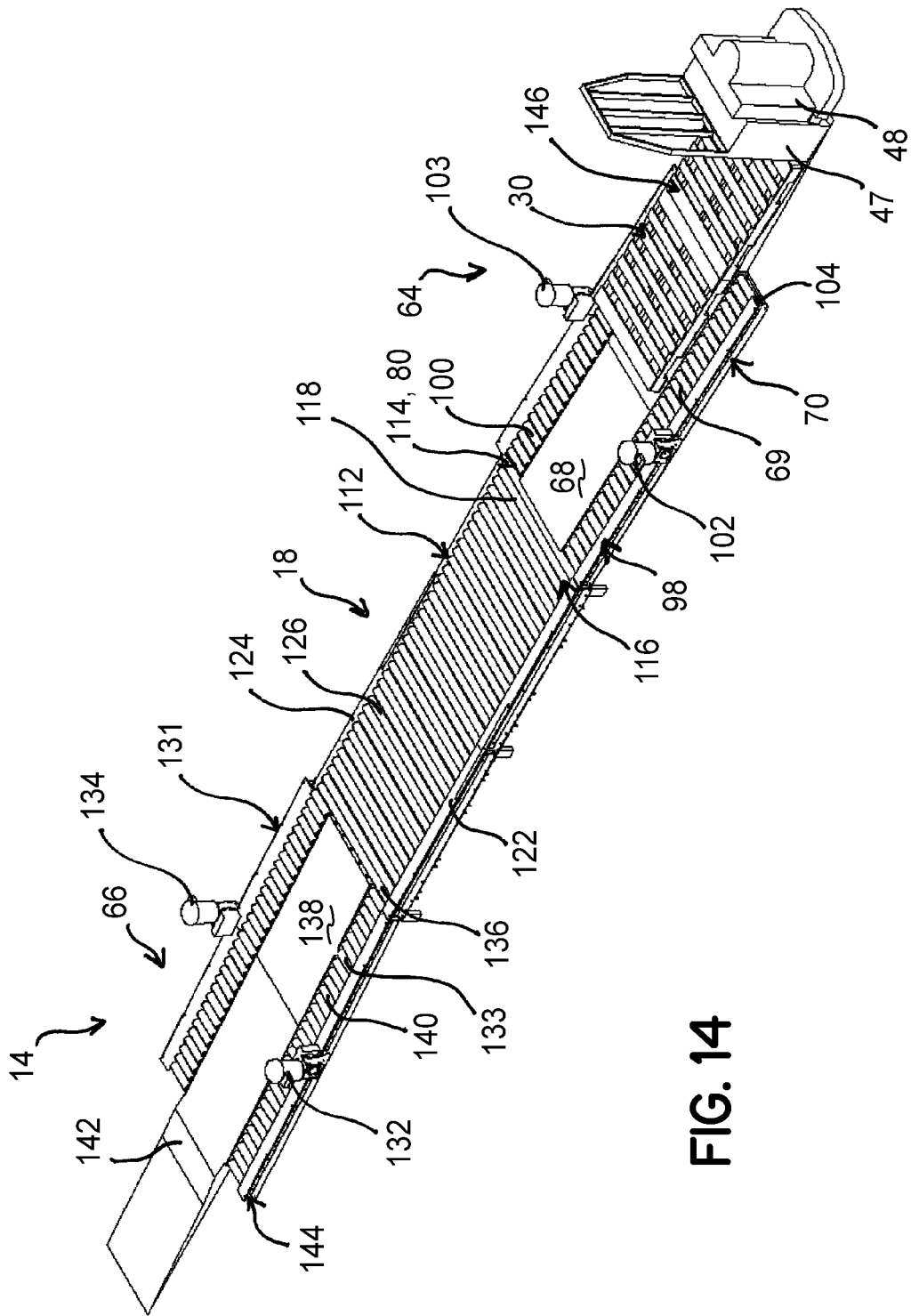
FIG. 14 shows an isometric view of a conveyor assembly and a pallet truck, according to an aspect of the present disclosure.
Figure 15:
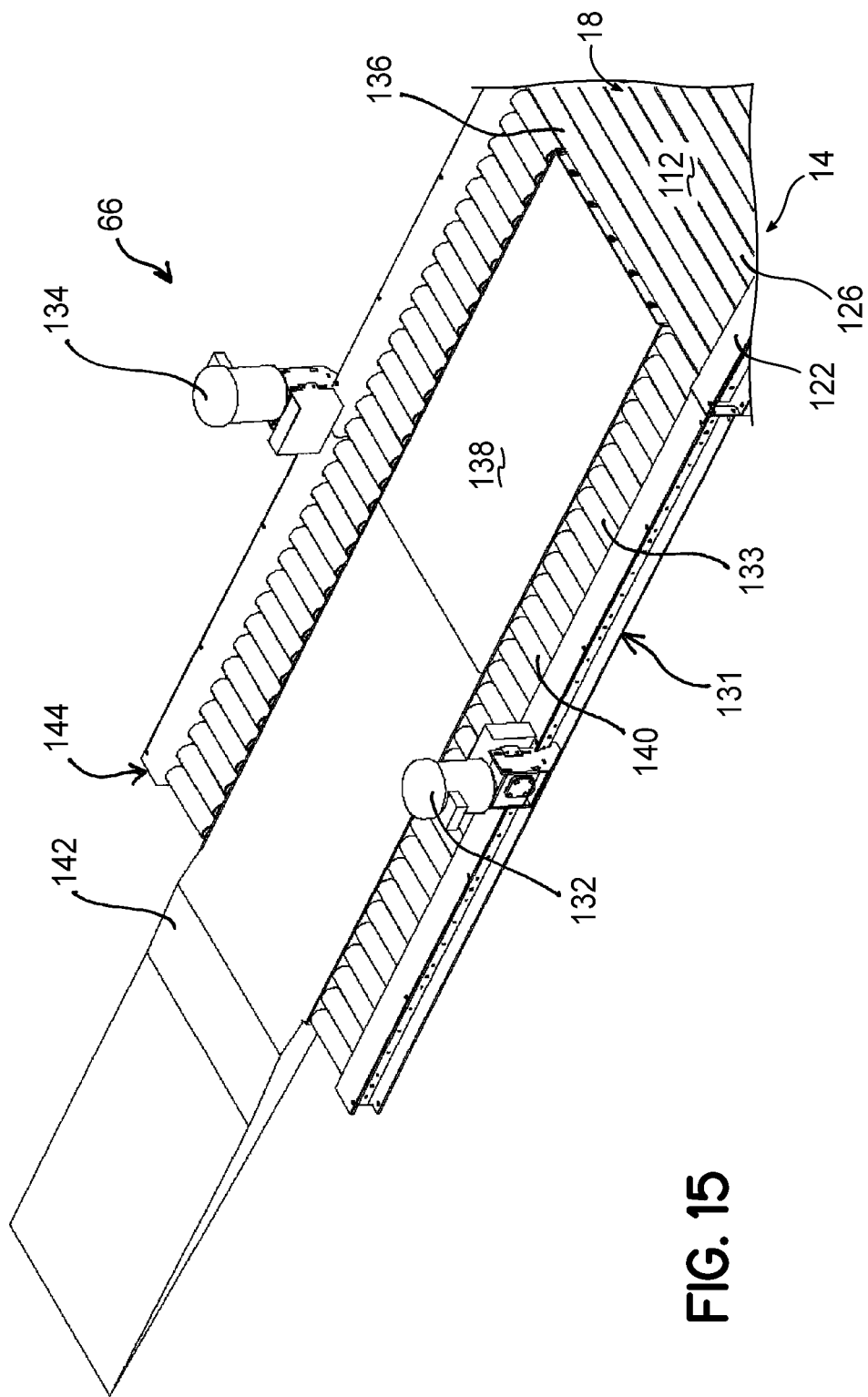
FIG. 15 shows an isometric view of an output portion of the conveyor assembly of FIG. 14, according to an aspect of the present disclosure.
Figure 16:
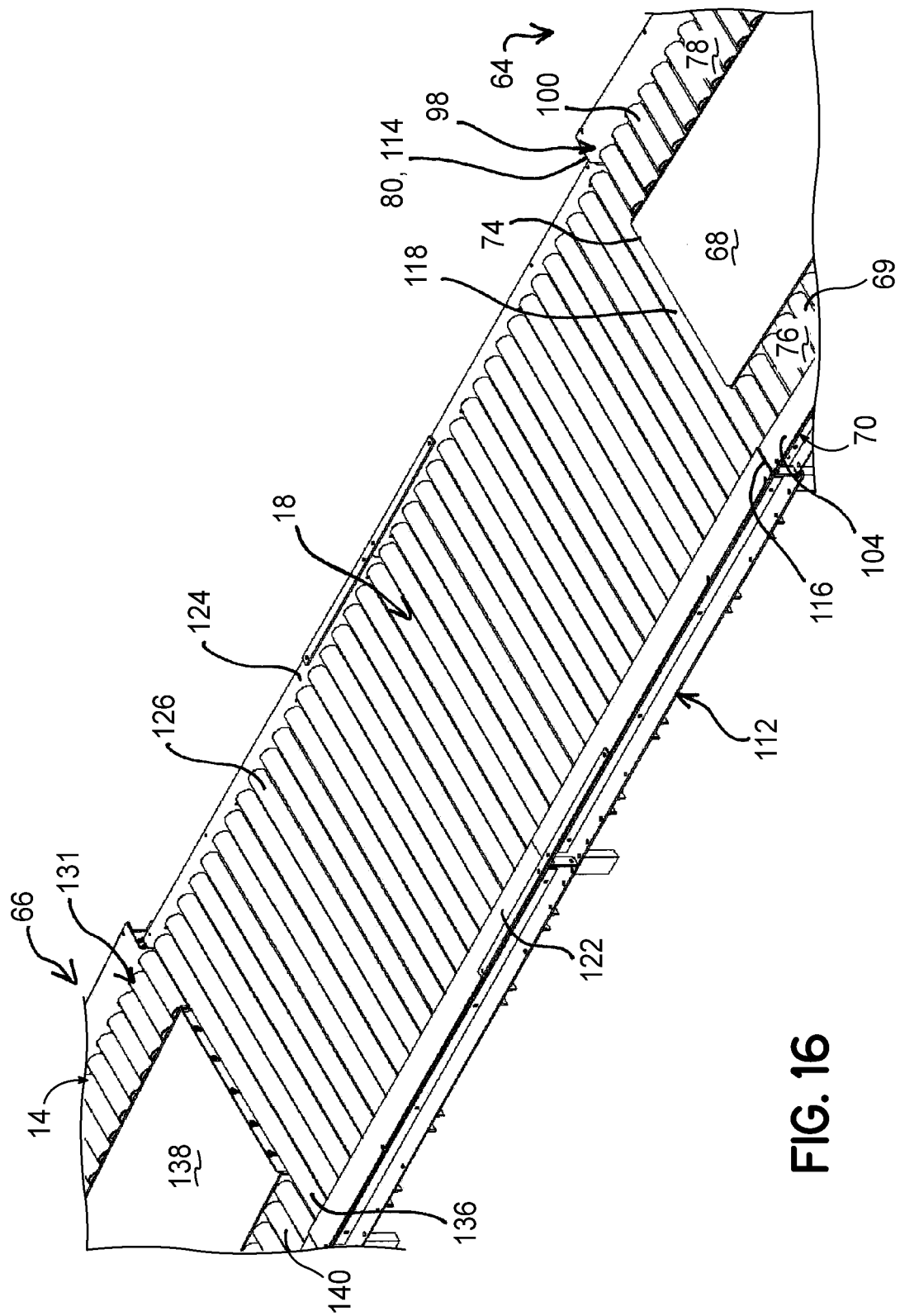
FIG. 16 shows an isometric view of a center portion of the conveyor assembly of FIG. 14, according to an aspect of the present disclosure.
Figure 17:
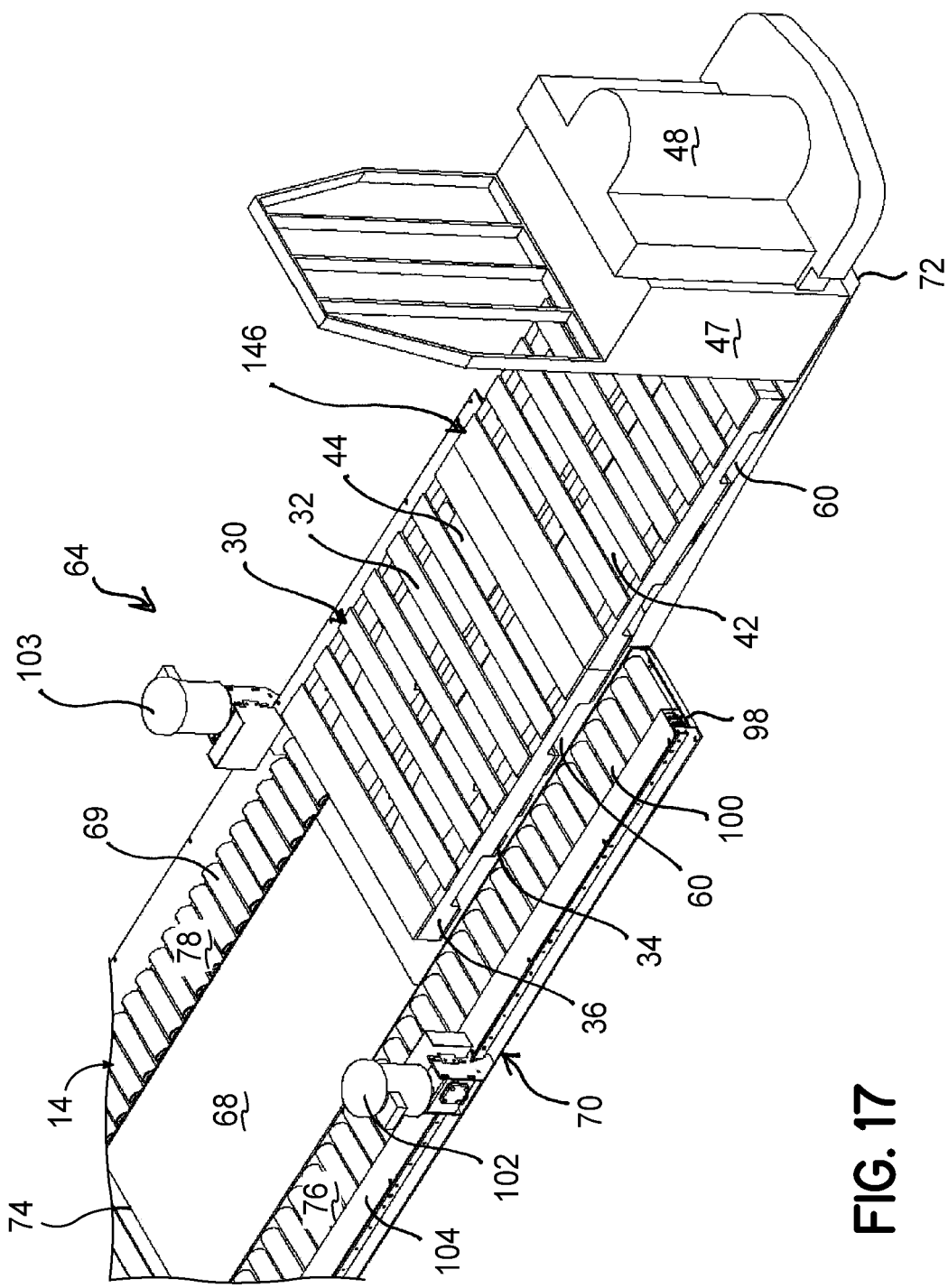
FIG. 17 shows an isometric view of an infeed portion of the conveyor assembly and the pallet truck of FIG. 14, according to an aspect of the present disclosure.
Figure 18:
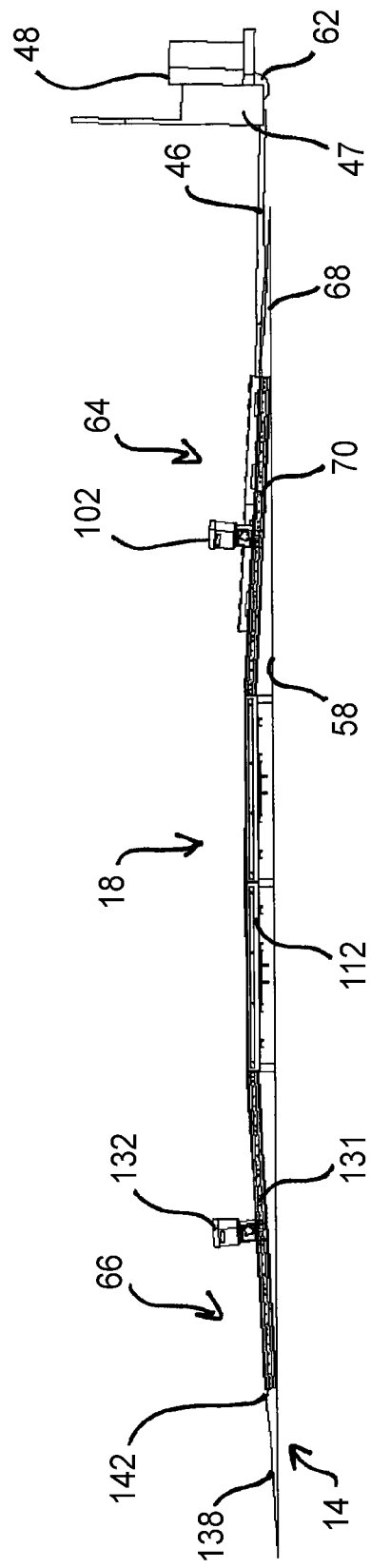
FIG. 18 shows a side view of a conveyor assembly and a pallet truck, according to an aspect of the present disclosure.
Figure 19:
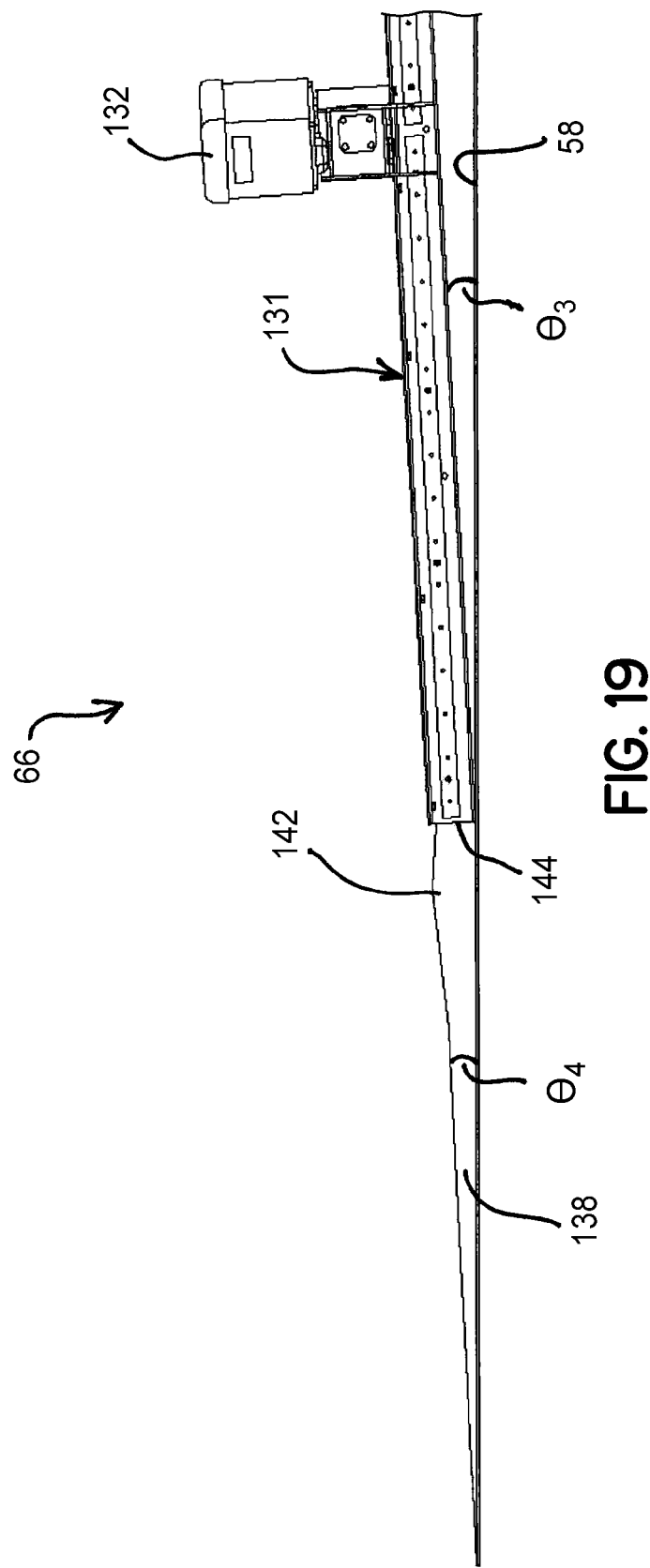
FIG. 19 shows a side view of an end portion of the conveyor assembly of FIG. 18, according to an aspect of the present disclosure.
Figure 20:
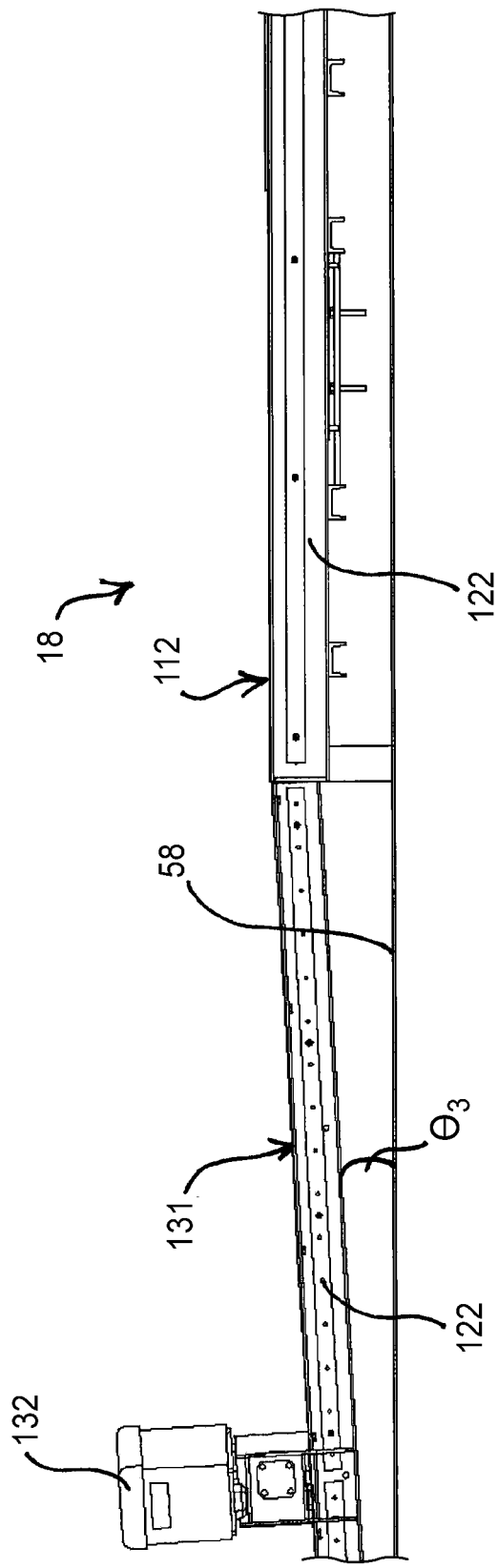
FIG. 20 shows a side view of an intermediate portion of the conveyor assembly of FIG. 18, according to an aspect of the present disclosure.
Figure 21:
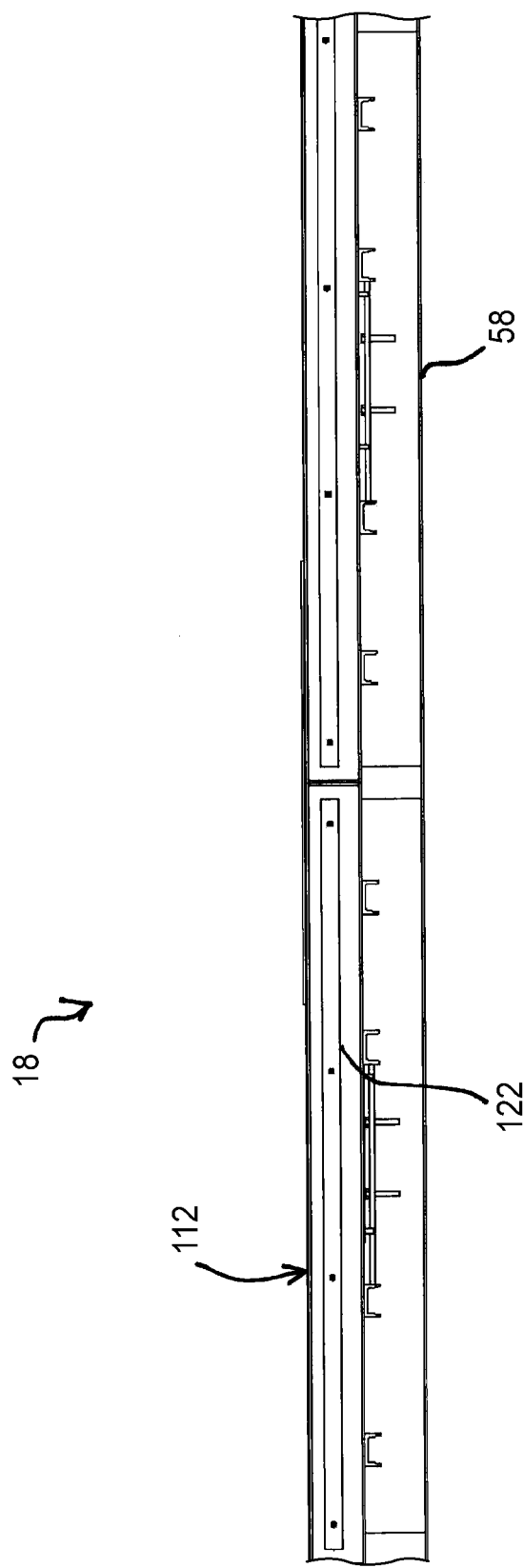
FIG. 21 shows a side view of a center portion of the conveyor assembly of FIG. 18, according to an aspect of the present disclosure.
Figure 22:
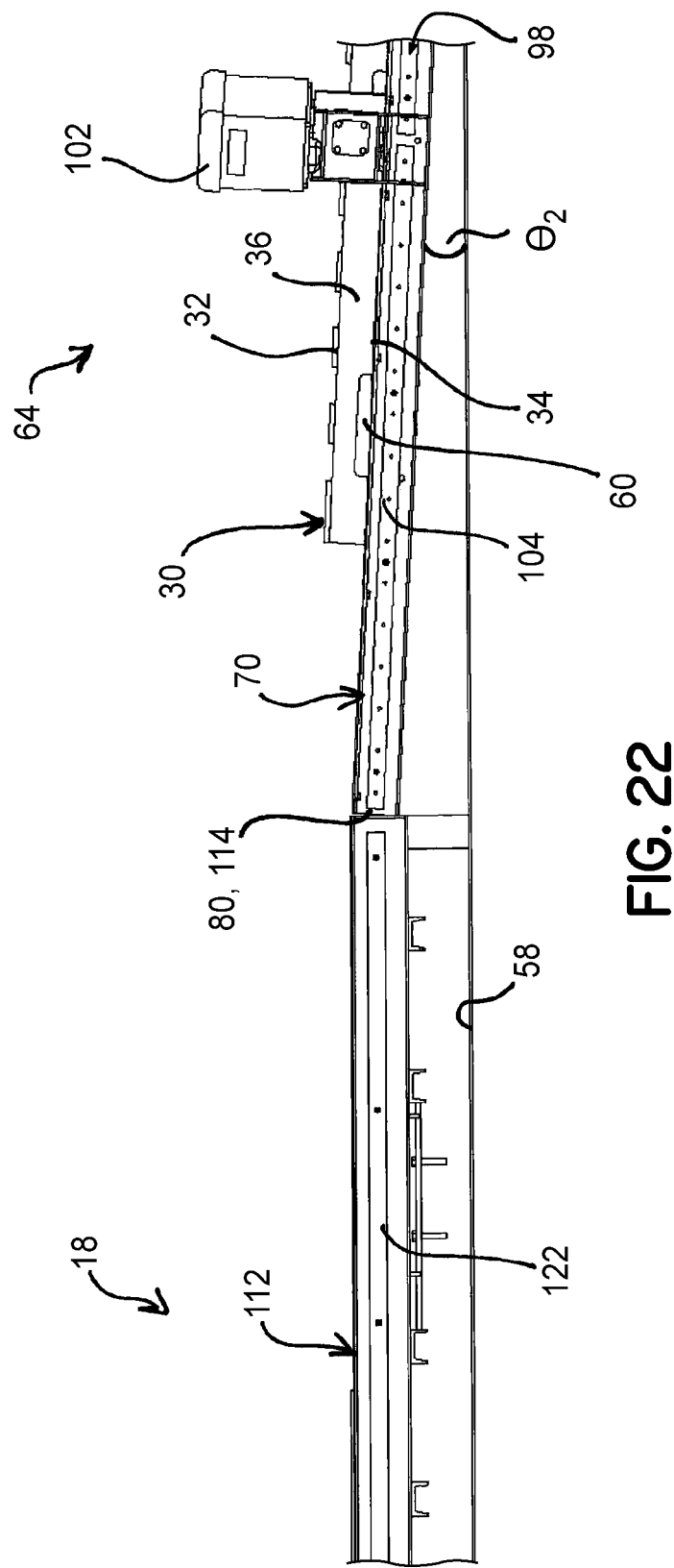
FIG. 22 shows a side view of another intermediate portion of the conveyor assembly of FIG. 18, according to an aspect of the present disclosure.
Figure 23:
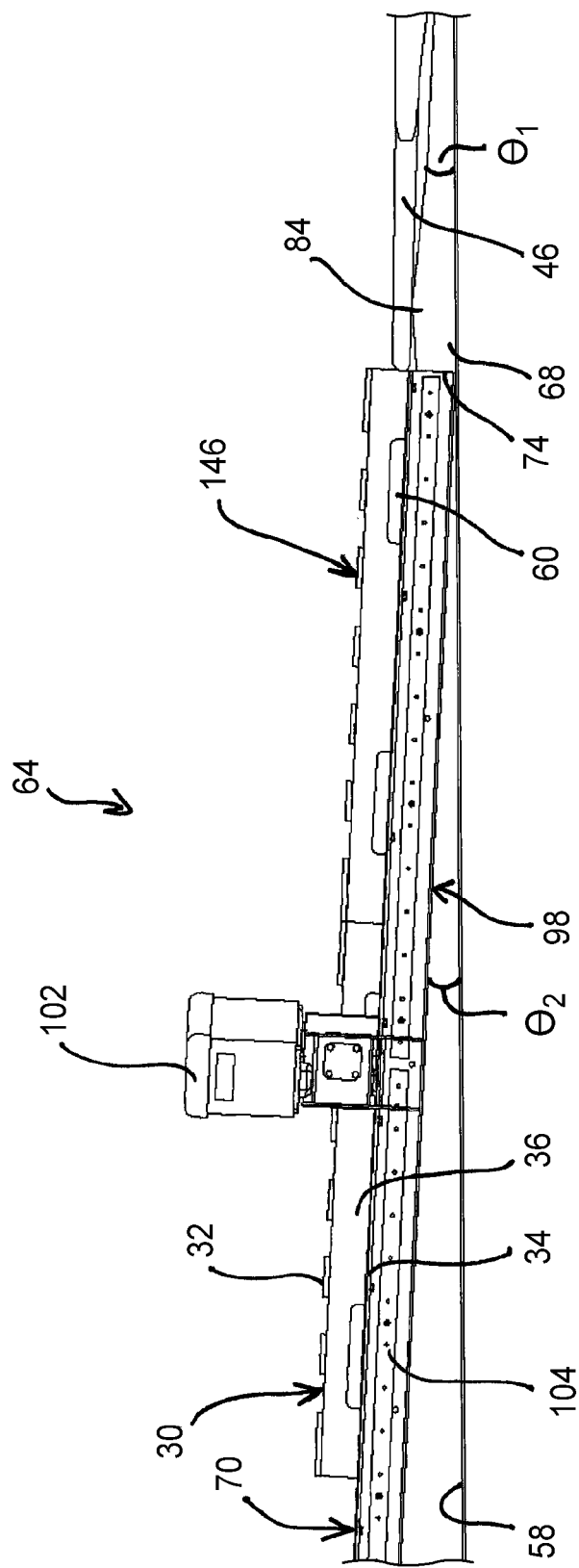
FIG. 23 shows a side view of a portion of the conveyor assembly of FIG. 18 supporting pallets, according to an aspect of the present disclosure.
Figure 24:
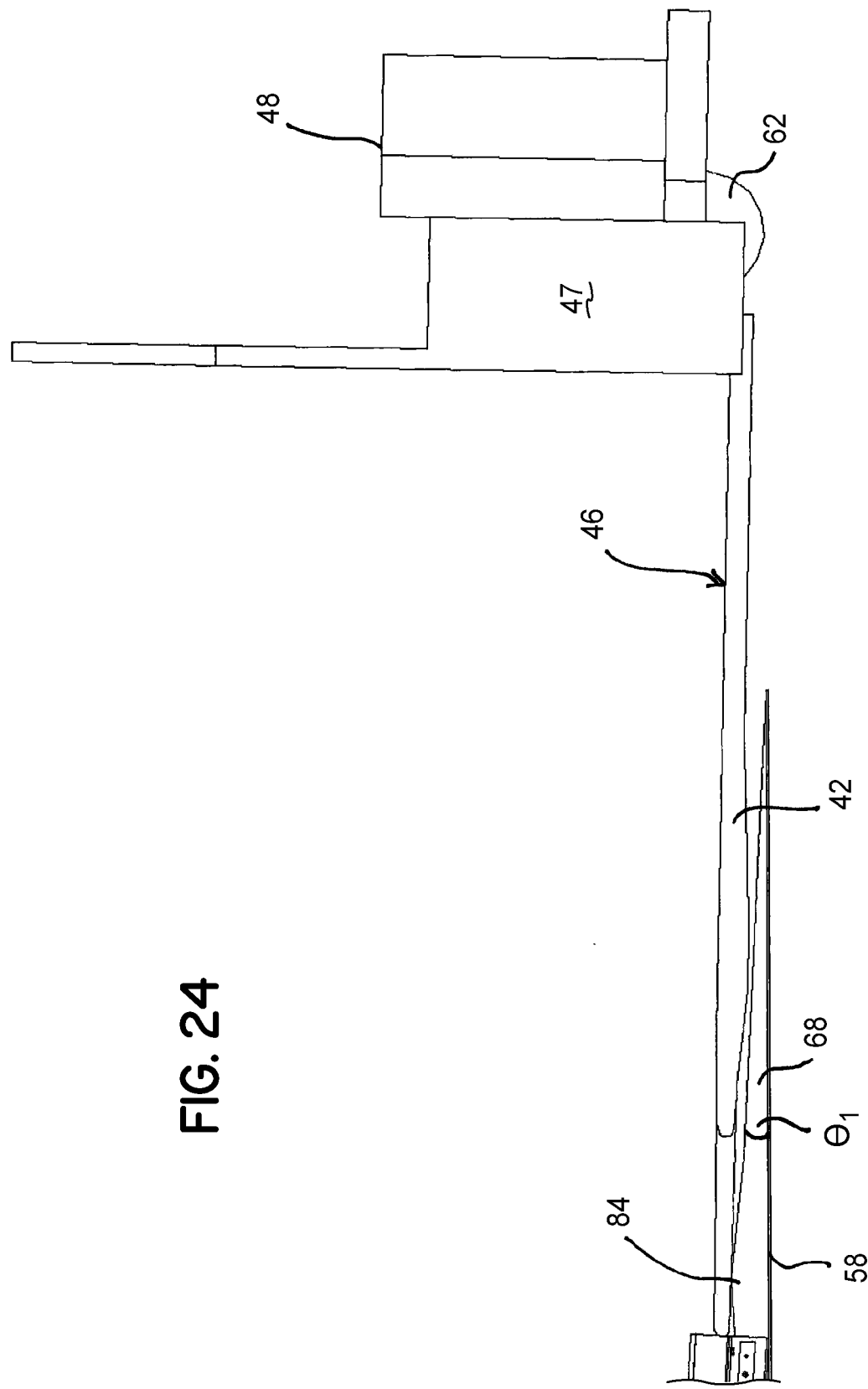
FIG. 24 shows a side view of another end portion of the conveyor assembly and the pallet truck of FIG. 18, according to an aspect of the present disclosure.
Figure 25:
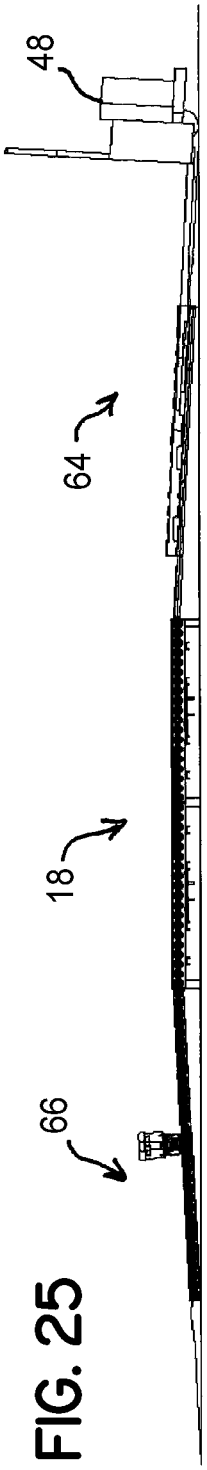
FIG. 25 shows a side view of a conveyor assembly and a pallet truck, according to an aspect of the present disclosure.
Figure 26:
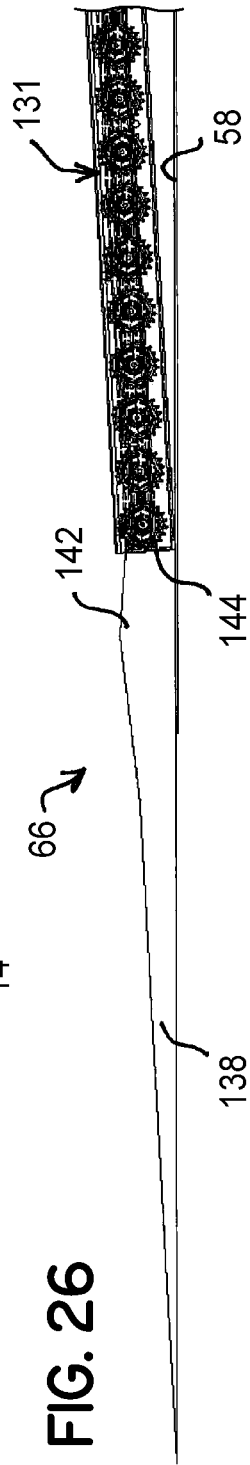
FIG. 26 shows a side view of an end portion of the conveyor assembly of FIG. 25, according to an aspect of the present disclosure.
Figure 27:
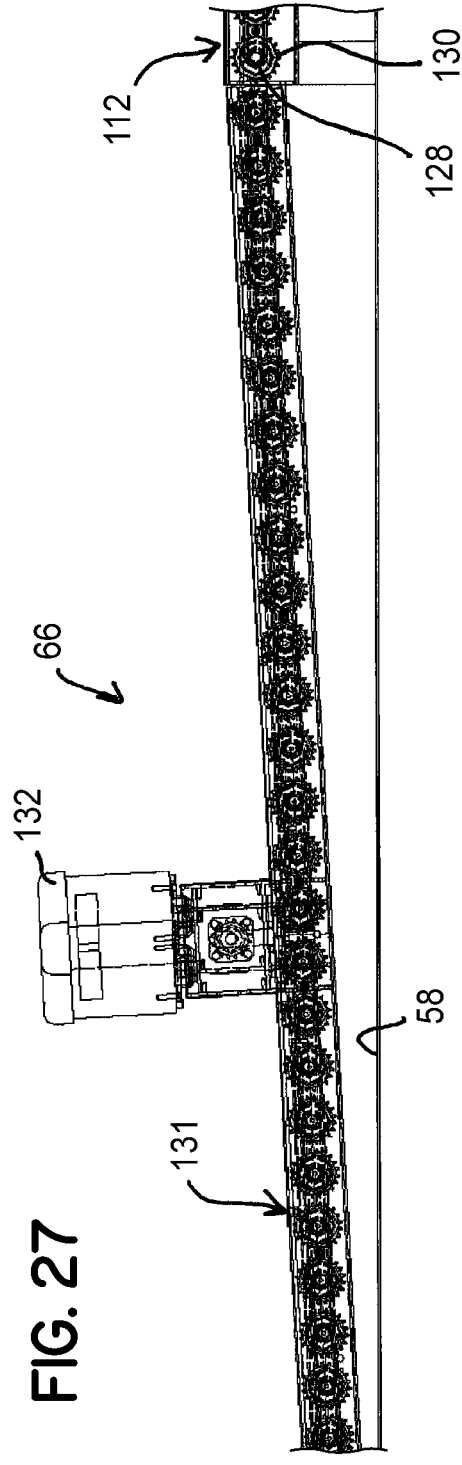
FIG. 27 shows a side view of an intermediate portion of the conveyor assembly of FIG. 25, according to an aspect of the present disclosure.
Figure 39:
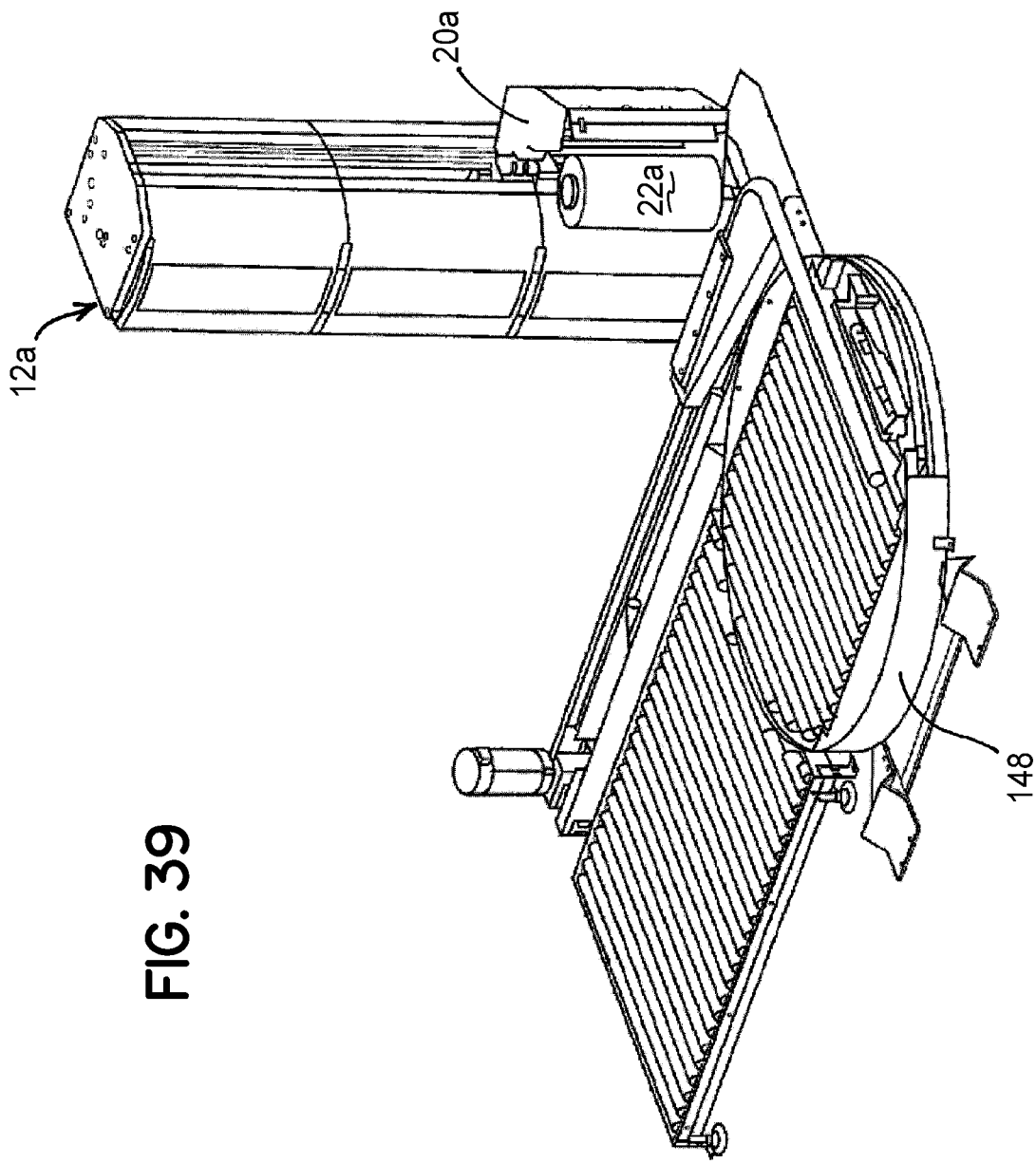
FIG. 39 shows an isometric view of a wrapping apparatus of a conveyorized wrapping system, according to an aspect of the present disclosure.

Wrapping apparatus 12 may wrap a palletized load 16, shown in phantom in FIG. 2, that is placed in a wrapping area 18. While palletized load 16 is in wrapping area 18, a packaging material dispenser assembly 20, carrying a roll of packaging material 22 (shown in FIG. 4), may rotate relative to palletized load 16. Packaging material dispenser assembly 20 is shown in FIGS. 2, 4, 5, 7, and 9. The relative rotation may be provided in one of the following ways. Packaging material dispenser 20 may be mounted on a 24, rotatably mounted to a frame 26, as shown in FIGS. 2-5 and 7-10. Rotating arm 24 may be rotated, thus rotating packaging material dispenser assembly 20 around palletized load 16 during wrapping. Packaging material dispenser assembly 20 may travel vertically relative to palletized load 16 while packaging material dispenser assembly 20 rotates about palletized load 16, causing packaging material to be wrapped spirally about palletized load 16. Alternatively, the relative rotation may be provided by a rotatable turntable 148 (see, e.g., FIG. 39). Rotatable turntable 148 may be part of a wrapping apparatus 12a including a packaging material dispensing assembly 20a configured to move vertically on a column to wrap packaging material from a roll 22a spirally about a palletized load. It is also contemplated that relative rotation may also be provided by a horizontal rotating ring or vertical rotating ring (not shown). For example, Additional and/or alternative features of wrapping apparatus 12 are described in U.S. Patent Application Publication No. 2007/0204565 A1, entitled "Method and Apparatus for Metered Pre-stretch Film Delivery," filed Feb. 23, 2007, and published Sep. 6, 2007, incorporated herein by reference in its entirety.

Figure 40:
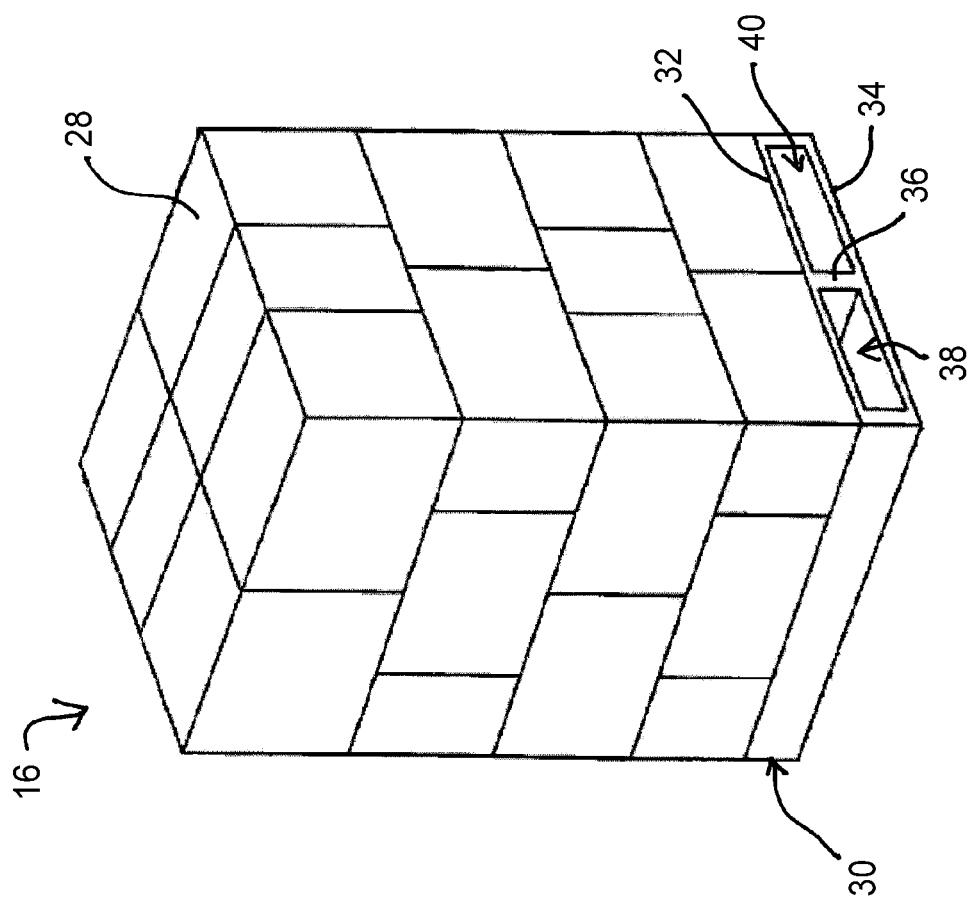
FIG. 40 shows an isometric view of a palletized load, according to an aspect of the present disclosure.
Figure 41:
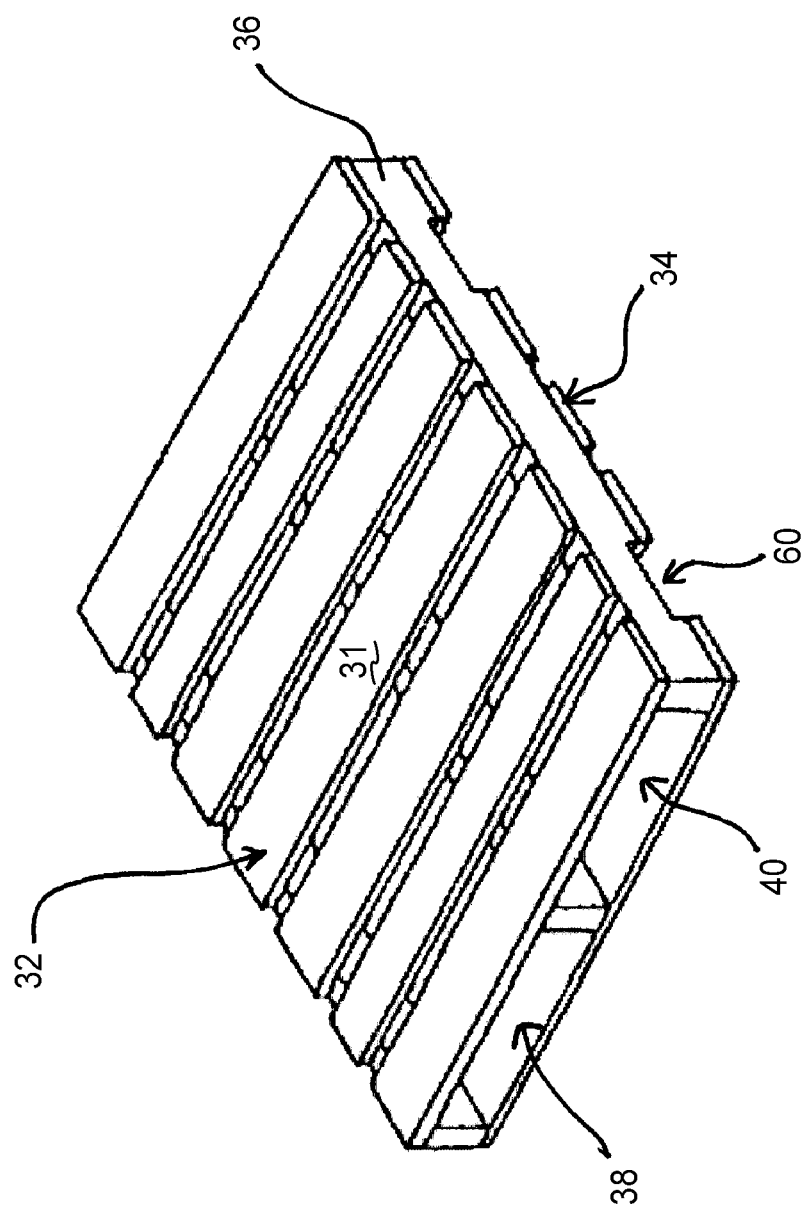
FIG. 41 shows an isometric view of a pallet, according to an aspect of the present disclosure.

Palletized load 16 may include one or more products 28 arranged on a pallet 30, as shown in FIG. 40. Pallet 30, shown in FIG. 41, may include a top plate 32, a bottom plate 34, and one or more stringers or supports 36 between top and bottom plates 32 and 34. Each of top and bottom plates 32 and 34 may include a plurality of boards, of which one has been identified as board 31 in FIG. 41. Pallet 30 may include one or more tunnels 38 and 40 extending between top plate 32 and bottom plate 34. Tunnels 38 and 40 form holes for receiving tines 42 and 44 of a fork 46 on a pallet truck 48. Any attempt to remove fork 46 in a direction perpendicular to the longitudinal axes of tunnels 38 and 40 is prevented by top plate 32, bottom plate 34, and stringers 36. Tunnels 38 and 40 may have a height of around 3.5 to 4.5 inches. Bottom plate 34 of pallet 30 may include one or more openings 60.

Figure 33:
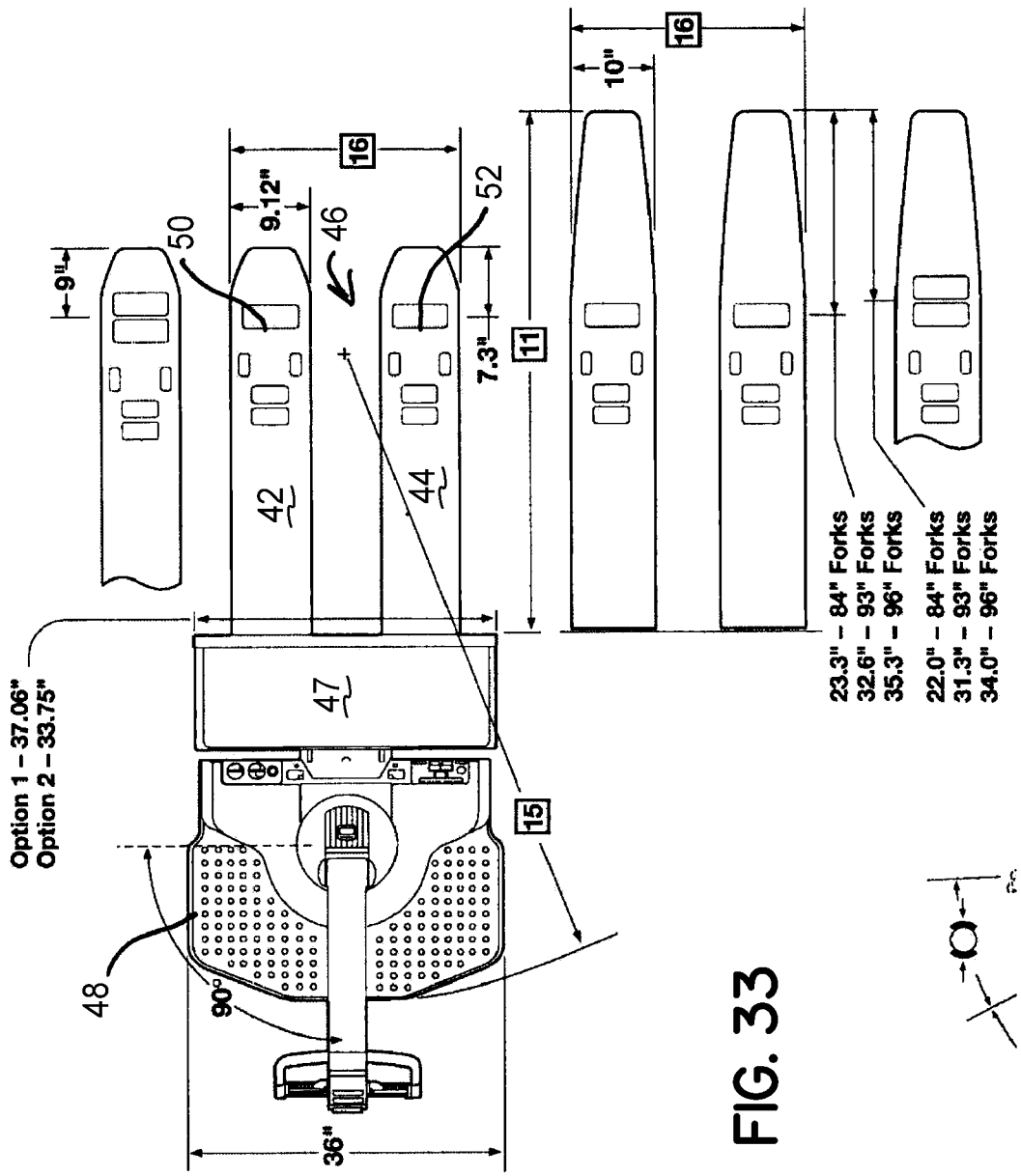
FIG. 33 shows a top view of a pallet truck with various options for fork construction, according to an aspect of the present disclosure.
Figure 34:
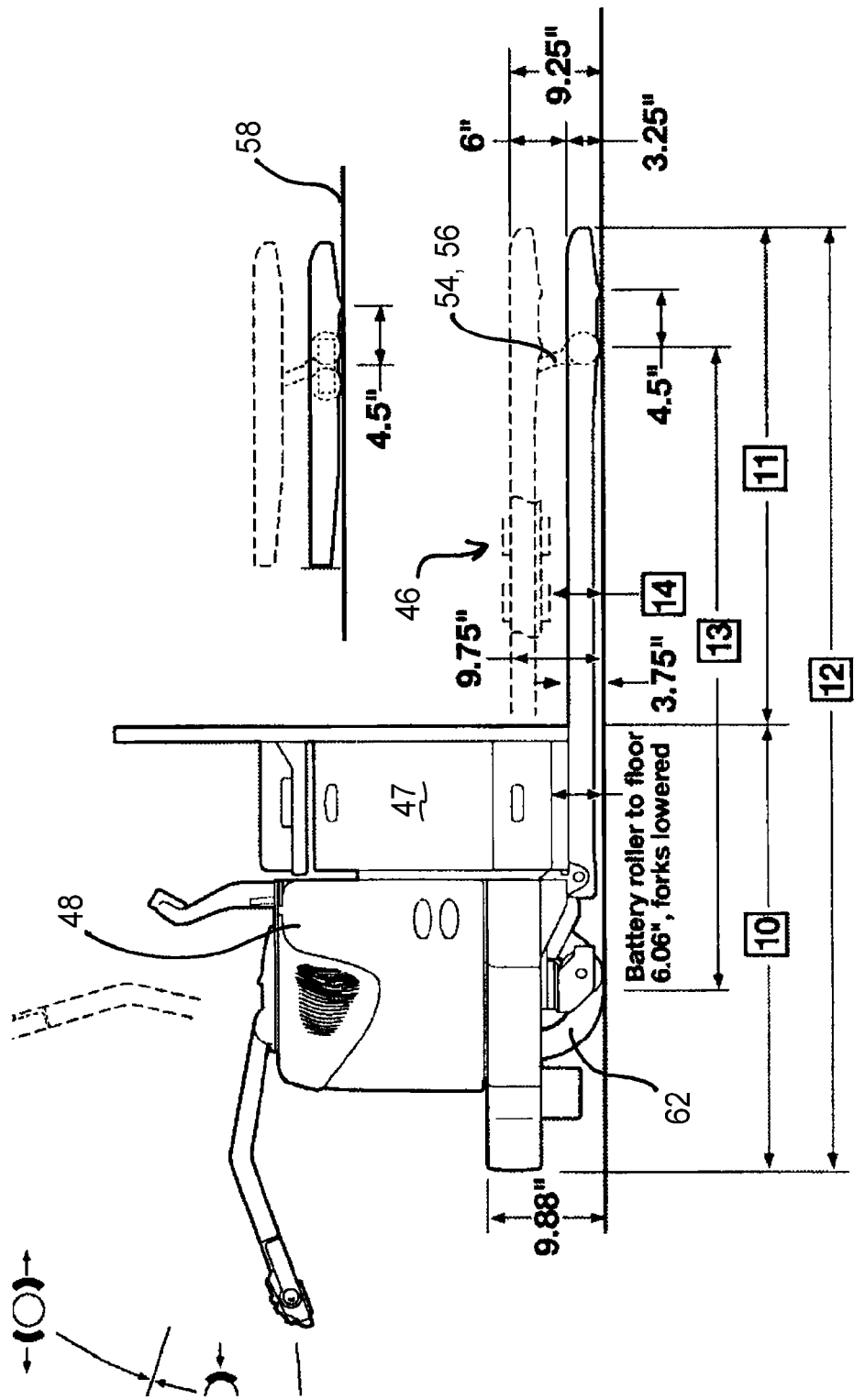
FIG. 34 shows a side view of a pallet truck, according to an aspect of the present disclosure.

Pallet truck 48, shown in FIGS. 33 and 34, may include tines 42 and 44 of fork 46, a drive wheel assembly 62 for moving pallet truck 48 around, and a battery box 47 coupled to fork 46.

Tines 42 and 44 may be cantilevered off of battery box 47. Tines 42 and 44 may include openings 50 and 52 on their bottom surfaces at or near their distal ends. Wheel assemblies 54 and 56 may retract into and extend out of openings 50 and 52 using hydraulic power, or any other suitable form of power. When wheel assemblies 54 and 56 are retracted, they may be contained within tines 42 and 44, such that wheel assemblies 54 and 56 are substantially flush with the bottom surfaces of tines 42 and 44. With wheel assemblies 54 and 56 in their retracted positions, tines 42 and 44 may be in their lowered position proximate a support surface 58, which may be substantially horizontal, such as the ground or any other suitable support surface. In the lowered position, tines 42 and 44 can be inserted into and extracted out of tunnels 38 and 40 of pallet 30.

Tunnels 38 and 40 may have a height of approximately 3.5 to 4.5 inches. Tines 42 and 44 may have a vertical thickness of about 3 inches, and a length sufficient to support one or more pallets. When tines 42 and 44 are in tunnels 38 and 40, there is very little vertical clearance between the surfaces of tines 42 and 44 and the surfaces of pallet 30. For example, if tines 42 and 44 were to rest on a top surface of a bottom plate of a pallet having tunnels with a height of 3.5 inches, there would be at most a clearance of 0.5 inches between the top surfaces of tines 42 and 44 and a lower surface of a top plate of the pallet. If tines 42 and 44 are tilted out of alignment with the longitudinal axes of the pallet's tunnels, tines 42 and 44 may wedge against the top and/or bottom plates of the pallet. This wedging is shown in FIG. 1, where imparting even a slight tilt to tines can cause the fork to bind or wedge against the pallet. The binding can be somewhat alleviated through the use of a long ramp with a gradual incline. However, such ramps require large amounts of space, and thus, are undesirable.

After tines 42 and 44 are inserted through tunnels 38 and 40 of pallet 30, wheel assemblies 54 and 56 may be extended out of openings 50 and 52 toward support surface 58. Wheel assemblies 54 and 56 may pass through openings 60 in bottom plate 34 of pallet 30. As wheel assemblies 54 and 56 engage support surface 58 they push tines 42 and 44 upward to a raised position. Battery box 47 may also rise, keeping tines 42 and 44 substantially parallel with the surface engaged by wheel assemblies 54 and 56. Tines 42 and 44 press against a lower surface of top plate 32 of pallet 30, thus raising palletized load 16 off of support surface 58, or any other surface engaged by wheel assemblies 54 and 56. At full extension of wheel assemblies 54 and 56, the top surfaces of tines 42 and 44 may reach a height of around 9.25 inches above support surface 58.

After palletized load 16 has been transported to a desired location, tines 42 and 44 may be lowered to place palletized load 16 in a desired location. Tines 42 and 44 may be lowered by retracting wheel assemblies 54 and 56. Battery box 47 also lowers, such that tines 42 and 44 remain substantially parallel to a plane extending through the points where the bottoms of wheel assemblies 54 and 56, and drive wheel assembly 62, are supported. As tines 42 and 44 are lowered, palletized load 16 may be placed on a desired surface. With wheel assemblies 54 and 56 retracted, tines 42 and 44 may come to rest on the top surface of bottom plate 34. Pallet truck 48 may be backed away from palletized load 16 to help extract tines 42 and 44 from tunnels 38 and 40. While the steps above have been described with respect to one pallet, pallet 30, it is contemplated that pallet truck 48 may pick up, transport, and drop off more than one pallet at a time, as shown in FIGS. 13, 14, 17, 18, 23, 25, 30, 31, and 36, following the steps above.

As shown in FIGS. 2-23, 25-29, 32, and 35-37, conveyor assembly 14 for transferring the palletized load 16 may include three areas: an infeed area 64, wrapping area 18, and an outfeed area 66. Unwrapped palletized loads 16 may be dropped off at infeed area 64. The unwrapped palletized loads 16 may be conveyed through infeed area 64 to wrapping area 18 for wrapping, after which the wrapped palletized loads may be conveyed away from wrapping area 18 to outfeed area 66. The wrapped palletized loads may be conveyed through outfeed area 66, where they may be picked up and transported to another location.

Infeed area 64 may include an infeed ramp 68 and an infeed conveyor 70. Infeed ramp 68 may be made of wood, steel, and/or any other suitable materials. Infeed ramp 68 may include an upstream end 72, where infeed ramp 68 meets supporting surface 58 (such as, for example, a floor or the ground), and a downstream end 74 opposite upstream end 72 (see, e.g., FIG. 10). "Upstream" and "downstream," as used in this application, are intended to define a direction of movement relative to the movement of palletized loads through conveyorized wrapping system 10. Thus, since palletized load 16 moves from infeed ramp 68 to outfeed ramp 138, movement toward infeed ramp 68 and against the movement of palletized load 16 through conveyorized wrapping system 10 is defined as "upstream," and movement away from infeed ramp 68 and with the movement of palletized load 16 through conveyorized wrapping system 10 is defined as "downstream."

Infeed ramp 68 may extend in an inclined manner toward wrapping area 18. Infeed ramp 68 may extend at least partially into infeed conveyor 70, splitting infeed conveyor 70 into left and right sides 76 and 78 (see FIGS. 2, 5, 6, 11, 12, 14, 16, 17, and 35-37). It is contemplated that infeed ramp 68 may extend along substantially the entire length of infeed conveyor 70, such that a downstream end 74 of infeed ramp 68 may be located proximate wrapping area 18 and a downstream end 80 of infeed conveyor 70. This arrangement allows infeed ramp 68 to provide a substantially smooth support surface for wheel assemblies 54 and 56 of pallet truck 48 when pallet truck 48 brings palletized load 16 to infeed conveyor 70. It is also contemplated that the top surface of infeed ramp 68 may be slightly below an angled top or conveyor surface 69 of infeed conveyor 70. Due to this offset, fork 46 may rest on the top surface of bottom plate 34 when fork 46 is in its lowered position. The offset may also help ensure that wheel assemblies 54 and 56 cannot be driven onto conveyor surface 69, which could damage infeed conveyor 70. Movement of portions (e.g., conveyor rollers, drag chains, and/or conveyor belts) of conveyor surface 69 may convey palletized load 16 along infeed conveyor 70.

Infeed ramp 68 may be sized and configured so that when tines 42 and 44 of pallet truck 48 are lowered to lower palletized load 16 onto infeed conveyor 70, the bottom surfaces of tines 42 and 44 may come to rest on the top surface of bottom plate 34 of pallet 30 when tines 42 and 44 are in their lowered positions and bottom plate 34 is resting on the conveyor surface 69 of infeed conveyor 70. Infeed ramp 68 may also be sized and configured so that tines 42 and 44 will not bind with or wedge against top and/or bottom plates 32 and 34 of pallet 30 when pallet 30 is lowered onto infeed conveyor 70. This may help to ensure that tines 42 and 44 may be extracted from tunnels 38 and 40 without disturbing palletized load 16 or damaging pallet 30.

Figure 42:
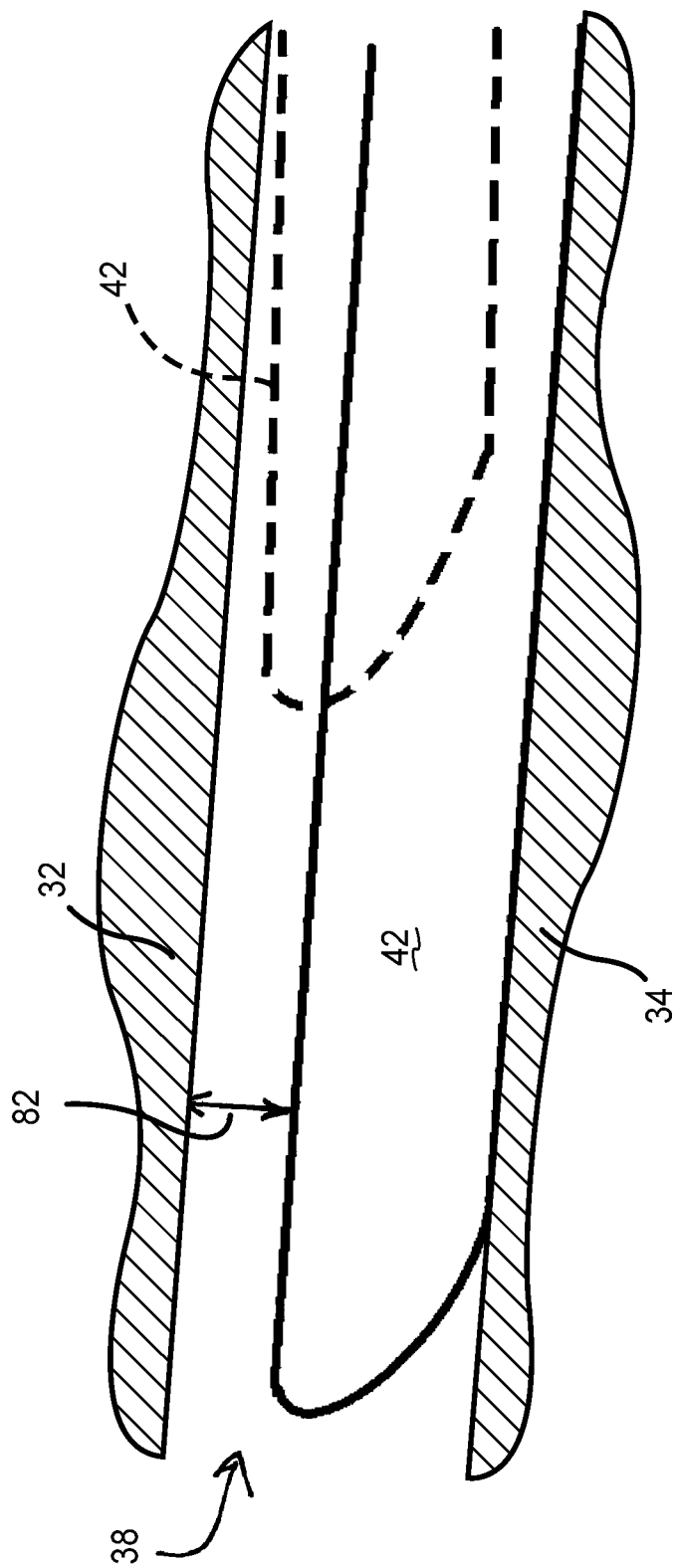
FIG. 42 shows an enlarged view of a portion of FIGS. 13 and 30-32, according to an aspect of the present disclosure.

Binding between pallet 30 and fork 46 may be avoided by providing a space or spaces between one or more surfaces of tines 42 and 44 of fork 46, and top and/or bottom plates 32 and 34 of pallet 30. For example, after fork 46 has been lowered to place palletized load 16 on infeed conveyor 70, tines 42 and 44 of fork 46 may initially remain in tunnels 38 and 40, with their bottom surfaces resting on the top of bottom plate 34 of pallet 30. A clearance 82, shown in FIGS. 13 and 30-32, may exist between the top surfaces of tines 42 and 44 and the lower surface of top plate 32. An enlarged view showing portions of the top surface of tine 42 and the lower surface of top plate 32, along with clearance 82, during a first state of extraction (with tine 42 shown in solid line) and a second state of extraction (with tine 42 shown in dashed line) is shown in FIG. 42. Having that clearance 82 may make it easier to extract tines 42 and 44 from tunnels 38 and 40 as pallet truck 48 is backed away from palletized load 16. If clearance 82 is not provided, as is the case in FIG. 1, a distal end of fork 46 may bind against a lower surface of top plate 32, and a proximal end of fork 46 may bind against an upper surface of bottom plate 34, trapping fork 46 in tunnels 38 and 40.

Angles for infeed ramp 68 and infeed conveyor 70 may be selected to produce clearance 82. For example, making the angle of the top surface of infeed ramp 68 (relative to support surface 58 or a horizontal plane) substantially equal to the angle of the conveyor surface 69 of infeed conveyor 70 (relative to support surface 58 or a horizontal plane), may produce the desired clearance 82. This is because as drive wheel assembly 62 of pallet truck 48 enters onto infeed ramp 68 while pallet truck 48 is carrying palletized load 16, engagement between wheel assemblies 54 and 56, and drive wheel assembly 62 of pallet truck 48, with the top surface of infeed ramp 68, may cause tines 42 and 44 to be angled in substantially the same way as infeed ramp 68. That is, tines 42 and 44, and therefore pallet 30, may be substantially parallel with the top surface of infeed ramp 68 and the conveyor surface 69 of infeed conveyor 70. As wheel assemblies 54 and 56 retract, tines 42 and 44 are lowered, moving palletized load 16 onto the conveyor surface 69 of infeed conveyor 70. Since battery box 47 lowers with tines 42 and 44, tines 42 and 44 may remain substantially parallel with the top surface of infeed ramp 68, the conveyor surface 69 of infeed conveyor 70, and/or top and bottom plates 32 and 34 of pallet 30, during lowering. This substantially parallel arrangement between the parts may be maintained as tines 42 and 44 come to rest on bottom plate 34, producing the desired clearance 82 between the top surfaces of tines 42 and 44 and top plate 32. The substantially parallel arrangement may be further maintained, at least initially, as pallet truck 48 is backed away from palletized load 16 to extract tines 42 and 44 from tunnels 38 and 40, since drive wheel assembly 62 of pallet truck 48 will remain on infeed ramp 68 during at least the initial portion of the extraction step.

In this disclosure, making an angle $\theta_1$ of the top surface of infeed ramp 68 with respect to support surface 58, such as the ground (see, e.g., FIGS. 23 and 24), substantially equal to an angle $\theta_2$ of the conveyor surface 69 of infeed conveyor 70 with respect to the support surface 58 or ground (see, e.g., FIGS. 22 and 23) may include making the angles identical. Additionally or alternatively, it may include making the angles slightly different, so long as clearance 82 is provided between tines 42 and 44 and top and/or bottom plates 32 and 34 for the extraction step.

The exact angle of each of the top surface of infeed ramp 68 and the conveyor surface 69 of infeed conveyor 70 may depend on a number of factors, including, for example, the height of tunnels 38 and 40, the thickness of tines 42 and 44, the length of tines 42 and 44, the dimensions of infeed conveyor 70, and other variables. The angle selected for each may include any angle where at least some clearance is provided between surfaces of tines 42 and 44 and top and/or bottom plates 32 and 34, and may not include any angle producing the binding shown in FIG. 1.

In this disclosure, the substantially parallel arrangement between tines 42 and 44, and top surface of infeed ramp 68, the conveyor surface 69 of infeed conveyor 70, and/or top and bottom plates 32 and 34 of pallet 30, may include arrangements in which tines 42 and 44 are actually parallel to those elements. It may also include arrangements in which tines 42 and 44 may be slightly non-parallel with respect to those elements, so long as they are positioned such that at least some clearance is provided between tines 42 and 44 and top and/or bottom plates 32 and 34 for the extraction step. It may not include arrangements like the one shown in FIG. 1, where tines 42 and 44 are so far from parallel with respect to top and/or bottom plates 32 and 34 that binding or wedging occurs.

The amount of clearance 82 may remain substantially constant during at least an initial phase of the extraction step. The initial phase may begin when pallet truck 48 starts to back away from palletized load 16 to extract tines 42 and 44 from tunnels 38 and 40, and may continue through the period in which drive wheel assembly 62 moves across the top surface of infeed ramp 68. During the initial phase, the angle of tines 42 and 44 relative to top and/or bottom plates 32 and 34, the conveyor surface 69 of infeed conveyor 70, and the top surface of infeed ramp 68, may remain substantially constant. This is because the conveyor surface 69 of infeed conveyor 70 and the top surface of infeed ramp 68 are inclined at similar angles with respect to the ground or other support surface 58. Thus, clearance 82 may remain substantially constant during the initial phase of the extraction. When drive wheel assembly 62 leaves infeed ramp 68 and passes onto support surface 58, the initial phase ends. Now, the angle of tines 42 and 44 will change due to the difference between the angle of support surface 58 and the angle of top and/or bottom plates 32 and 34 positioned on the conveyor surface 69 of infeed conveyor 70 or the top surface of infeed ramp 68. As the angle of tines 42 and 44 changes, the amount of clearance 82 may change. For example, when drive wheel assembly 62 hits support surface 58, a portion of the top surface of tines 42 and 44 may rise toward top plate 32. However, if tines 42 and 44 have been extracted far enough out of tunnels 38 and 40 by the time drive wheel assembly 62 hits support surface 58, there is more room for movement of tines 42 and 44 in tunnels 38 and 40 than there would be if tines 42 and 44 were fully inserted in tunnels 38 and 40. The extra room for movement may prevent tines 42 and 44 from binding or wedging against top and/or bottom plates 32 and 34 of pallet 30. Accordingly, the angle of infeed ramp may also be selected after giving consideration to the effect of the substantially instantaneous change in angle of tines 42 and 44 as drive wheel assembly 62 travels from infeed ramp 68 to support surface 58. Along with the angle, the length of infeed ramp 68 may be considered and selected such that the portions of tines 42 and 44 remaining in tunnels 38 and 40 will have clearance, and thus, will not bind or wedge against pallet 30 when infeed ramp 68 ends and the angle of tines 42 and 44 change.

Similarly, the length of tines 42 and 44 may also affect the clearance during the change in angle. For example, with shorter tines, a change in the angle of the shorter tines may leave enough of a clearance to prevent binding between the tines and a pallet. However, with longer times, the same change in angle may leave less of a clearance, or may even eliminate the clearance, potentially causing binding between the tines and the pallet. This is because a change in the angular orientation of a shorter tine produces less movement at the tip of the tine than that which is produced with a longer tine undergoing the same change in the angular orientation. Thus, with shorter tines, the angle of incline of infeed ramp 68 relative to support surface 58 may be greater than the angle of incline for longer tines.

Infeed ramp 68 may include a protrusion 84, proximate an upstream end of infeed conveyor 70 and a downstream end of infeed ramp 68. Protrusion 84 may be sized and configured such that near the end of the extraction step, when tines 42 and 44 are almost fully extracted (see FIGS. 13, 23, 24, 31, and 32), protrusion 84 may engage the bottom surfaces of tines 42 and 44 as they exit tunnels 38 and 40 of pallet 30 so that tines 42 and 44 do not damage bottom plate 34 of pallet 30 near the entrance of tunnels 38 and 40. It is contemplated that the upstream portion of protrusion 84 may be inclined at an angle relative to support surface 58 that is different than the angle at which the top surface of infeed ramp 68 is inclined relative to support surface 58. Alternatively, the upstream portion of protrusion 84 may be inclined at an angle relative to support surface 58 that is substantially equal to the angle at which the top surface of infeed ramp 68 is inclined relative to support surface 58. It is also contemplated that the downstream portion of protrusion 84 may have a decline with respect to support surface 58. When using an infeed ramp length of approximately 60.6 inches, an angle of incline of infeed ramp 68 relative to support surface 58 of approximately 3.58°, and an angle of incline of infeed conveyor 70 relative to support surface 58 of approximately 2.50°, the angle of decline of the downstream portion of protrusion 84 may be approximately 6.42° with respect to support surface 58.

Infeed ramp 68 may also include a stop 86 on its top surface. Stop 86, shown in FIG. 35, may be centered on the top surface so that tines 42 and 44 may pass by either side of stop 86 as pallet truck 48 carries palletized load 16 to infeed conveyor 70. Stop 86 may abut a portion of pallet truck 48, like battery box 47, for example, to prevent further movement of pallet truck 48 up infeed ramp 68. Thus, stop 86 may help to ensure that pallet truck 48 and the palletized loads it carries are consistently positioned with respect to infeed conveyor 70.

Figure 35:
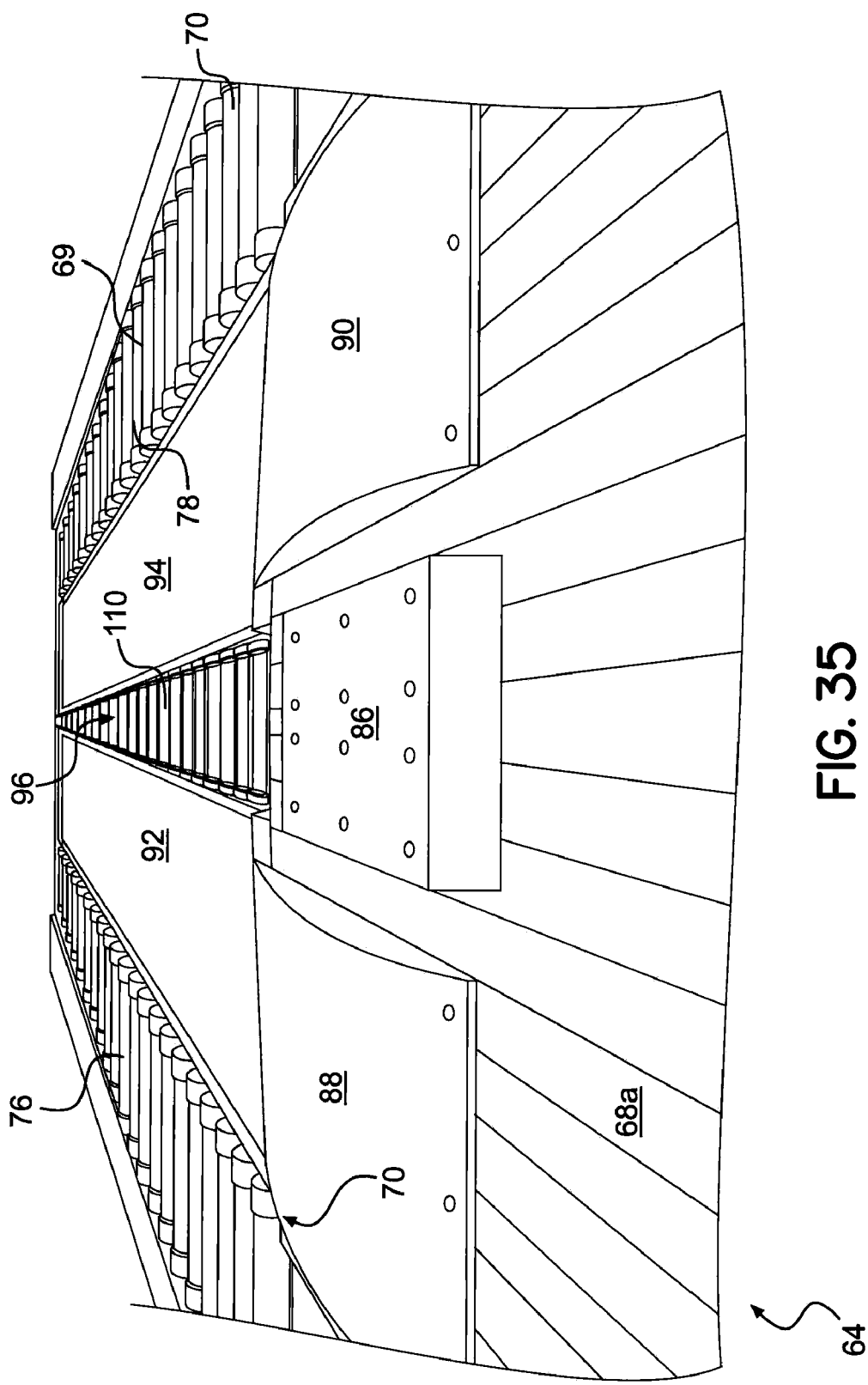
FIG. 35 is a photograph of an infeed area of a conveyorized wrapping system, according to an aspect of the present disclosure.
Figure 36:
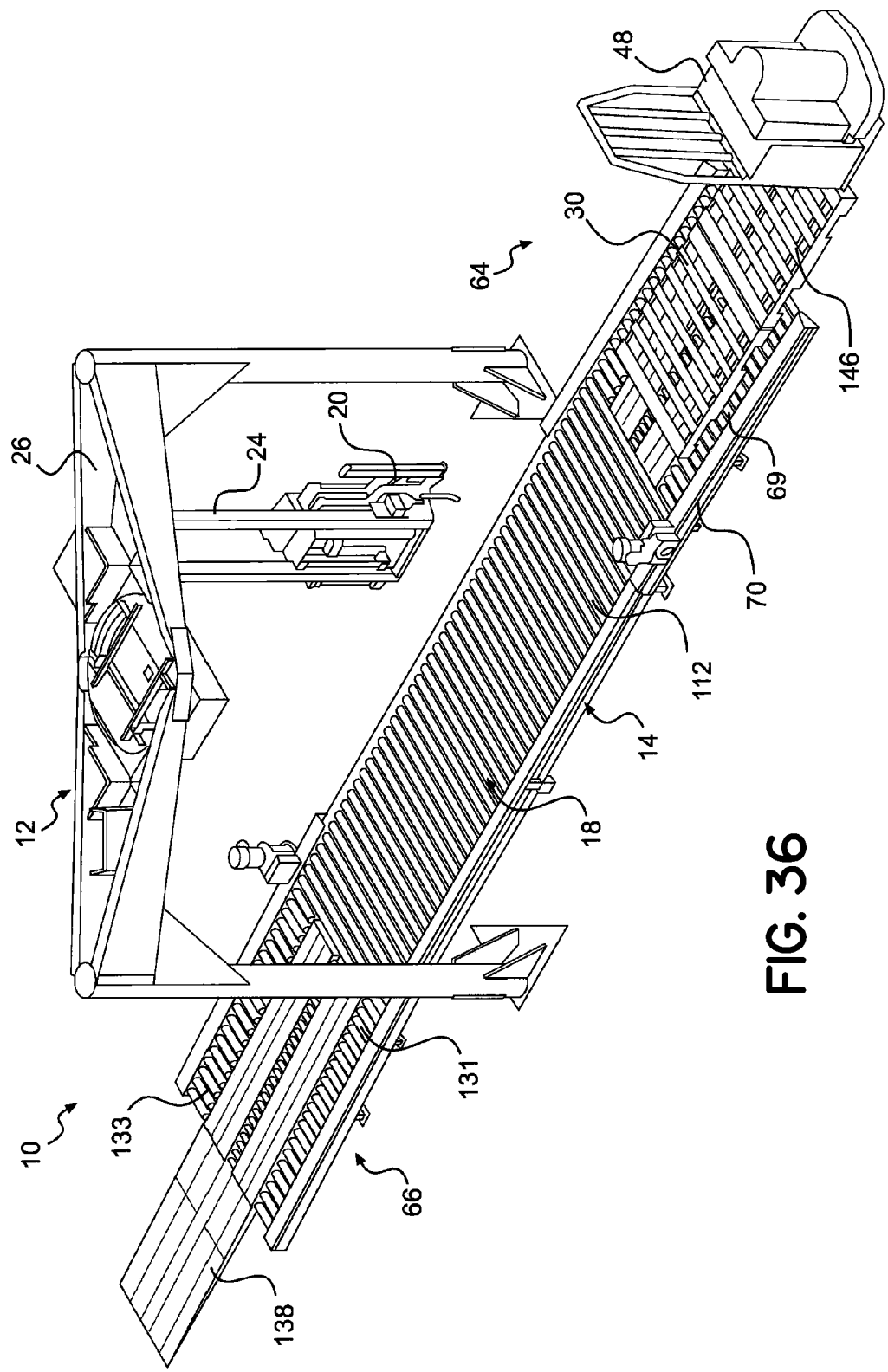
FIG. 36 shows an isometric view of a conveyorized wrapping system and a pallet truck, according to an aspect of the present disclosure.
Figure 37:
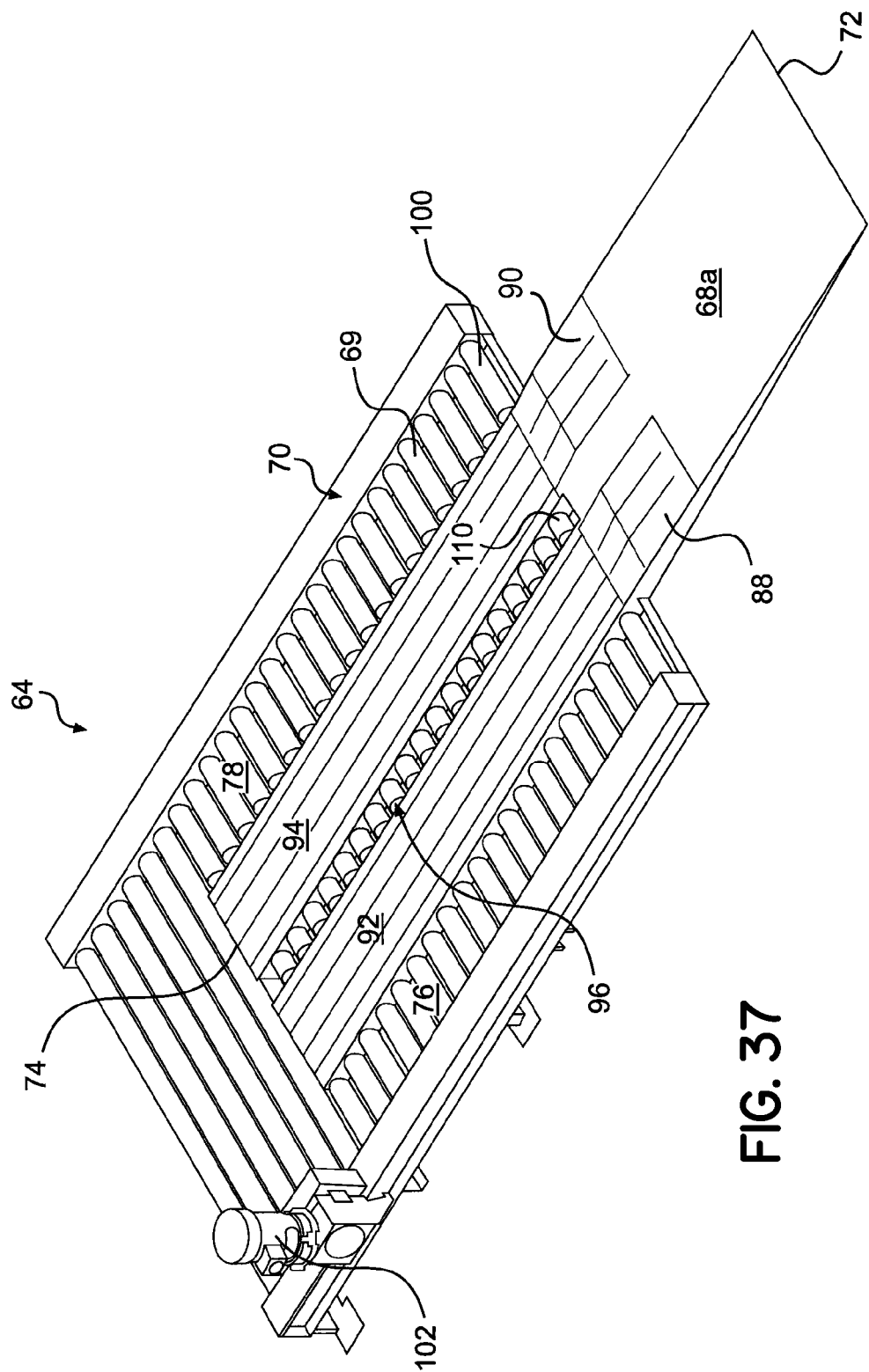
FIG. 37 shows an isometric view of an infeed area of a conveyorized wrapping system, according to an aspect of the present disclosure.
Figure 38:
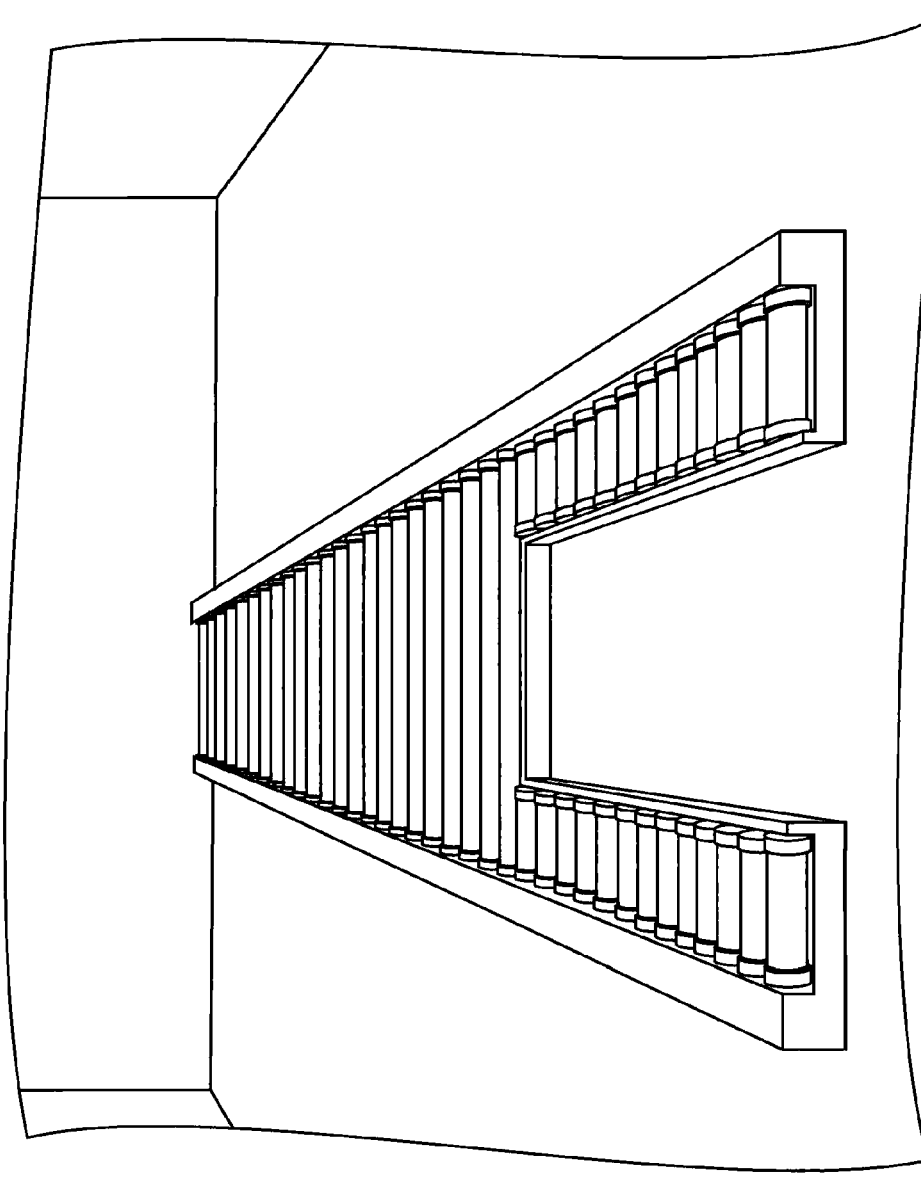
FIG. 38 shows a photograph of a conventional conveyor.

In the embodiment shown in FIGS. 35-37, an infeed ramp 68a may be similar to infeed ramp 68, and may prevent binding of tines 42 and 44 in a manner similar to infeed ramp 68, but infeed ramp 68a may include dual protrusions 88 and 90 aligned with left and right sides 92 and 94 extending into infeed conveyor 70. Left protrusion 88 may engage tine 42, while right protrusion 90 may engage tine 44. Protrusions 88 and 90 may be similar to protrusion 84, but may have lesser widths than protrusion 84, creating the space for stop 86. In this split arrangement, infeed conveyor 70 may be divided into left, center, and right regions 76, 78, and 96, respectively. Center region 96 may be offset vertically by, for example, 0.25 inches, relative to left and right regions 76 and 78. Center region 96 may thus provide additional support for palletized load 16 once palletized load 16 is lowered onto infeed conveyor 70, and more particularly, may provide support for portions of pallet 30 bowing under the pressure of palletized load 16.

Angles $\theta_1$ and $\theta_2$ may each be approximately 2 to 4 degrees. In one example, angles $\theta_1$ and $\theta_2$ may be approximately 2.4 degrees. In this example, infeed ramp 68 may have a length of approximately sixty-two inches, and infeed conveyor 70 may have a pass height of approximately 3.25 inches. The pass height may be equal to a distance between support surface 58 and conveyor surface 69 at the upstream end of infeed conveyor 70. With these dimensions and angles, clearance 82 may be provided, whether tines 42 and 44 have a shorter length (for carrying one pallet) or a longer length (for carrying two pallets).

In another example, angles $\theta_1$ and $\theta_2$ may be approximately 3.58° and 2.50°, respectively. In this example, infeed ramp 68 may have a length of approximately 60.6 inches (along support surface 58), and infeed conveyor 70 may have a length of approximately 97.5 inches (along support surface 58) and conveyor surface 69 may reach a height of approximately 7.5 inches the downstream end of infeed conveyor 70. With these dimensions and angles, clearance 82 may be provided, whether tines 42 and 44 have a shorter length (for carrying one pallet) or a longer length (for carrying two pallets).

Once palletized load 16 has been placed on infeed conveyor 70, infeed conveyor 70 may transport palletized load 16 to wrapping area 18. As shown in FIGS. 2, 5-7, 9-12, 14, 16-18, 22, 23, 25, and 35-37, infeed conveyor 70 may include a frame 98, rollers 100, and drive mechanisms 102 and 103. Additionally or alternatively, infeed conveyor 70 may include one or more drag chains (not shown) and/or conveyor belts (not shown) mounted on frame 98 and driven by drive mechanisms 102 and 103 to transport palletized load 16 to wrapping area 18.

Infeed conveyor 70 may be inclined. For example, infeed conveyor 70 may be inclined at an angle approximately equal to the angle of incline of infeed ramp 68. Frame 98 may include side rails 104 configured to support rotatable rollers 100. Rollers 100 may be journaled on axles 106 coupled to frame 98 and infeed ramp 68. Rollers 100 may include sprockets 108 coupled to drive mechanism 102 and/or drive mechanism 103 by, for example, a drive belt, drive chain, or other suitable connection (not shown). Through that connection, drive mechanisms 102 and 103 may rotate rollers 100. It is contemplated that rollers 100 may be driven in unison, in sections, or individually. The rotation of rollers 100 may transport palletized load 16 from infeed ramp 68 to wrapping area 18 along infeed conveyor 70. Additional features are described in U.S. Pat. No. 5,056,653 to Lancaster, issued Oct. 15, 1991, and entitled "Roller Conveyor," which is incorporated herein by reference in its entirety. In central region 96 of infeed conveyor 70, idle rollers 110 may be provided to support palletized load 16.

Wrapping area 18 may include a wrapping area conveyor 112, defining a wrapping surface on which palletized load 16 may rest. A distal end 114 of infeed conveyor 70 may meet a proximal end 116 of wrapping area conveyor 112. In order to ease the transition of palletized load 16 as it moves from infeed conveyor 70, which is inclined, to wrapping area conveyor 112, which is substantially level, one or more round off rollers 118, or any other suitable round off section, may be placed where infeed conveyor 70 and wrapping area conveyor 112 meet. Wrapping area conveyor 112 may include a frame with two side rails 122 and 124, and rollers 126 rotatably supported by side rails 122 and 124. Rollers 126 may be journaled on axles 128 coupled to side rails 122 and 124. Rollers 126 may include sprockets 130 coupled to drive mechanism 102, drive mechanism 103, drive mechanism 132, and/or drive mechanism 134 by, for example, a drive belt, drive chain, or other suitable connection. Through that connection, those drive mechanisms may rotate rollers 126. The rotation of rollers 126 may transport palletized load 16 through wrapping area 18 in the direction of outfeed area 66. Additional features are described in U.S. Pat. No. 5,056,653 to Lancaster, issued Oct. 15, 1991, and entitled "Roller Conveyor," which is incorporated herein by reference in its entirety. Additionally or alternatively, wrapping area conveyor 112 may include one or more drag chains (not shown) and/or conveyor belts (not shown) driven by drive mechanisms 102, 103, 132, and/or 134 to transport palletized load 16 through wrapping area 18.

While palletized load 16 is in wrapping area 18, palletized load 16 may be held stationary by preventing rollers 126 from rotating, allowing wrapping apparatus 12 to perform the wrapping process on a stationary load. Once palletized load 16 is wrapped, wrapping area conveyor 112 may convey palletized load 16 toward outfeed conveyor 131 of outfeed area 66. In order to ease the transition of palletized load 16 as it moves away from wrapping area conveyor 112, which is substantially level, to outfeed conveyor 131, which is inclined, one or more round off rollers 136, or any other suitable round off section, may be placed where wrapping area conveyor 112 and outfeed conveyor 131 meet or merge Outfeed area 66 may include outfeed conveyor 131 and an outfeed ramp 138, as shown in FIGS. 2-4, 7-9, 14-16, 18-20, 25-27, and 36. Outfeed ramp 138 may be made of wood, steel, and/or any other suitable materials. Outfeed area 66 may be a mirror image of infeed area 64, and thus, the components of outfeed area 66 may be similar to those described with respect to infeed area 64. Rollers 140 and drive mechanisms 132 and 134 of outfeed area, however, transport palletized load 16 down an incline toward outfeed ramp 138. Additionally or alternatively, outfeed conveyor 131 may include one or more drag chains (not shown) and/or conveyor belts (not shown) driven by drive mechanisms 132 and 134 to transport palletized load 16 toward outfeed ramp 138. It is contemplated that palletized load 16 may be transported to an end portion of outfeed conveyor 131 along an angled top or conveyor surface 133 of outfeed conveyor 131, with palletized load 16 positioned above a top surface of outfeed ramp 138. Outfeed ramp 138, like infeed ramp 68, may include one or more protrusions 142, and may extend at least partially into outfeed conveyor 131. Pallet truck 48 may be driven toward outfeed ramp 138 with tines 42 and 44 in a position substantially parallel to support surface 58. As pallet truck 48 begins to progress up outfeed ramp 138, tines 42 and 44 may be brought into engagement with protrusions 142, and guided into tunnels 38 and 40 of pallet 30 of palletized load 16. During at least a portion of insertion of tines 42 and 44 into tunnels 38 and 40, the tines 42 and 44 may be maintained in a position substantially parallel to outfeed conveyor 131 to avoid binding or wedging of tines 42 and 44 in pallet 30. For example, a clearance, similar to clearance 82, may be maintained between tines 42 and 44 and pallet 30. Wheel assemblies 54 and 56 may then extend out from openings 50 and 52 in tines 42 and 44, through openings 60 in bottom plate 34 of pallet 30, and into engagement with the top surface of outfeed ramp 138, causing tines 42 and 44 to raise palletized load 16. Pallet truck 48 may then be backed off from outfeed ramp 138 and driven away to transport palletized load 16 to another location.

It is contemplated that an angle $\theta_4$ of the top surface of outfeed ramp 138 with respect to a support surface, such as the ground (see, e.g., FIGS. 18-20) may be substantially equal to angle $\theta_1$, and an angle $\theta_3$ of the conveyor surface 133 of outfeed conveyor 131 with respect to the support surface or ground be substantially equal to angle $\theta_2$. Angles $\theta_3$ and $\theta_4$ may be substantially identical. Additionally or alternatively, angles $\theta_3$ and $\theta_4$ may be slightly different, so long as a clearance, similar to clearance 82, is provided between tines 42 and 44 and top and/or bottom plates 32 and 34 during insertion of tines 42 and 44 into pallet 30. The exact angle of each of the top surface of outfeed ramp 138 and the conveyor surface 133 of outfeed conveyor 131 may depend on a number of factors, including, for example, the height of tunnels 38 and 40, the thickness of tines 42 and 44, the dimensions of outfeed conveyor 131, and other variables. The angle selected for each may include any angle where at least some clearance is provided between surfaces of tines 42 and 44 and top and/or bottom plates 32 and 34, and may not include any angle producing binding, such as the binding shown in FIG. 1.

Angles $\theta_3$ and $\theta_4$ may each be approximately 2 to 4 degrees. In one example, angles $\theta_3$ and $\theta_4$ may be approximately 2.4 degrees. In this example, outfeed ramp 138 may have a length of approximately sixty-two inches, and outfeed conveyor 131 may have a pass height of approximately 3.25 inches. The pass height may be equal to a distance between support surface 58 and conveyor surface 133 at the downstream end of outfeed conveyor 131. With these dimensions and angles, clearance 82 may be provided, whether tines 42 and 44 have a shorter length (for carrying one pallet) or a longer length (for carrying two pallets).

In another example, angles $\theta_3$ and $\theta_4$ may be approximately 2.50° and 3.58°, respectively. In this example, outfeed ramp 128 may have a length of approximately 60.6 inches (along support surface 58), and outfeed conveyor 131 may have a length of approximately 97.5 inches (along support surface 58) and conveyor surface 133 may reach a height of approximately 7.5 inches at the upstream end of outfeed conveyor 131. With these dimensions and angles, clearance 82 may be provided, whether tines 42 and 44 have a shorter length (for carrying one pallet) or a longer length (for carrying two pallets).

A method of use of conveyorized wrapping system 10 will now be described.

A picker in a distribution center or other facility may build palletized load 16. To build palletized load 16, the picker may drive pallet truck 48 as it supports pallet 30 on fork 46. Tines 42 and 44 of fork 46 may extend through tunnels 38 and 40 in pallet 30, and wheel assemblies 54 and 56 may be extended to engage support surface 58 (see the extended state shown in phantom in FIG. 34) so that pallet 30 is in a raised position. The picker may drive pallet truck 48 between rows of products, picking the necessary products and placing them on pallet 30 to form palletized load 16.

To position palletized load 16 in infeed area 64 of conveyor assembly 14, the picker may direct pallet truck 48 toward proximal end 72 of infeed ramp 68. Wheel assemblies 54 and 56, and then drive wheel assembly 62, may ride over the top surface of infeed ramp 68 as pallet truck 48 carries palletized load 16 above a proximal end of infeed conveyor 70. When stop 86 engages a portion of pallet truck 48, such as, for example, battery box 47, palletized load 16 is in position for placing palletized load 16 on infeed conveyor 70. Retracting wheel assemblies 54 and 56 may lower tines 42 and 44, lowering palletized load 16 onto the top or conveyor surface 69 of infeed conveyor 70. Tines 42 and 44 may come to rest on the top surface of bottom plate 34 of tunnels 38 and 40 of pallet 30. Pallet truck 48 may back away from infeed ramp 68 to extract tines 42 and 44 from tunnels 38 and 40. As pallet truck 48 backs out, a portion of the bottom surfaces of tines 42 and 44 may slide along the top surface of bottom plate 34 of pallet 30, while clearance 82 may be provided between the top surfaces of tines 42 and 44 and the bottom surface of top plate 32, so as to avoid binding or wedging fork 46 in tunnels 38 and 40. Clearance 82 may be maintained during the initial phase of the extraction where drive wheel assembly 62 of pallet truck is on the top surface of infeed ramp 68. When drive wheel assembly 62 passes from infeed ramp 68 to support surface 58, clearance 82 may vary, but tines 42 and 44 may nevertheless remain free from binding engagement with pallet 30. As tip portions of tines 42 and 44 approach exiting tunnels 38 and 40, protrusion 84 may engage the bottom surfaces of tines 42 and 44 to keep tines 42 and 44 from damaging bottom plate 34 of pallet 30 as the tip portions of tines 42 and 44 are fully extracted (see FIGS. 23, 24, and 32).

Palletized load 16 may be positioned on infeed conveyor 70 while another load is transported by infeed conveyor 70 toward wrapping area 18, while another load is being wrapped in wrapping area 18, while a wrapped load is being transported by outfeed conveyor 131 toward outfeed ramp 138, and/or while a wrapped load is awaiting pick up by pallet truck 48 at outfeed ramp 138.

Palletized load 16 may be transported toward wrapping area 18 by infeed conveyor 70. This transporting may be accomplished by activating drive mechanisms 102 and 103 to rotate rollers 100, with the moving surfaces of rollers 100 propelling palletized load 16 through their engagement with bottom plate 34 of pallet 30. Round off rollers 118 may ease the transition of palletized load 16 from angled infeed conveyor 70 to the substantially level wrapping area conveyor 112. Once palletized load 16 is positioned in wrapping area 18, relative rotation may be provided between palletized load 16 and packaging material dispensing assembly 20 by rotating rotatable arm 24 around palletized load 16. As rotatable arm 24 and packaging material dispenser assembly 20 rotate, packaging material from roll 22 may be wrapped around the sides of the palletized load 16. Packaging material dispenser assembly 20 may be driven vertically along the sides of palletized load 16, causing packaging material to be wrapped spirally about palletized load 16.

Once palletized load 16 has been wrapped, drive mechanisms 102, 103, 132, and/or 134 may rotate rollers 126 to transport the newly wrapped palletized load 16 from wrapping conveyor 112 to outfeed conveyor 131, with round off rollers 136 easing the transition from the level wrapping conveyor 112 to the inclined outfeed conveyor 131. Drive mechanisms 132 and 134 may rotate rollers 140 to transport palletized load 16 along outfeed conveyor 131. It is also contemplated that palletized load 16 may move down outfeed conveyor 131 due to gravitational forces. In that case, rollers 140 may rotate freely, or may be driven at a speed slower than that of free rotation to prevent palletized load 16 from picking up excessive speed. Palletized load 16 may be transported to a distal end 144 of outfeed conveyor 131. Pallet truck 48 may be directed toward distal end of outfeed ramp 138. Tines 42 and 44 may occupy their lowered positions, and thus, may engage protrusion 142 as fork 46 is directed into tunnels 38 and 40 of pallet 30. Protrusion 142 may support tines 42 and 44 in a position that may prevent tines 42 and 44 from damaging bottom plate 34 of pallet 30 near the entrance into tunnels 38 and 40, during an initial phase of the insertion step. During this initial phase, drive wheel assembly 62 may be on support surface 58.

As drive wheel assembly 62 of pallet truck 48 continues up outfeed ramp 138, the angle of outfeed ramp 138 will cause tines 42 and 44 to become substantially parallel to the top surface of outfeed ramp 138, the conveyor surface of outfeed conveyer 131, and/or the top and bottom plates of pallet 30. This parallel arrangement allows for tines 42 and 44 to be inserted into tunnels 38 and 40 by moving pallet truck 48 up outfeed ramp, without causing tines 42 and 44 to bind or grab pallet 30. Additionally or alternatively, tines 42 and 44 may ride on bottom plate 34, while maintaining a sufficient clearance with respect to top plate 32 (e.g., like clearance 82) to prevent binding. Tines 42 and 44 will then travel through tunnels 38 and 40, in a direction substantially parallel to top and/or bottom plates 32 and 34, and/or in a direction substantially along the longitudinal axes of tunnels 38 and 40, until pallet truck 48 reaches a stop (similar to stop 86 but not shown), indicating that tines 42 and 44 are in their proper position.

Once tines 42 and 44 are in place, wheel assemblies 54 and 56 may be extended through holes in bottom plate 34 to press tines 42 and 44 into top plate 32 and lift palletized load 16 up from off of the top or conveyor surface 133 of outfeed conveyor 131. Pallet truck 48 may be backed away from outfeed ramp 138, with wheel assemblies 54 and 56 riding over the top surface of outfeed ramp 138. With palletized load 16 and wheel assemblies 54 and 56 clear from outfeed ramp 138, pallet truck 48 may maneuver palletized load 16 to another location.

It is also contemplated that the picker may build multiple palletized loads. Each of the palletized loads may be built on its own pallet, and those pallets, represented by pallets 30 and 146 in FIGS. 13, 14, 17, 18, 22, 23, 25, 30-32, and 36, may be supported one in front of the other on tines 42 and 44 of pallet truck 48. Pallets 30 and 146 and their corresponding loads may be supported, raised, lowered, and maneuvered using pallet truck 48 in a manner similar to that of palletized load 16. Method steps for loading and unloading multiple palletized loads may be similar to those described above for palletized load 16. Infeed ramp 68 may extend at least partially into infeed conveyor 70 to provide room for pallets 30 and 146.

After palletized loads have been wrapped, they may be positioned near each other at outfeed ramp 138 so that fork 46 can be inserted through tunnels 38 and 40 of pallets 30 and 146. Outfeed ramp 138 may extend into outfeed conveyor 131a sufficient distance to allow wheel assemblies 54 and 56 of pallet truck 48 to lift the wrapped palletized loads from off of outfeed conveyor 131, and to provide a surface for wheel assemblies 54 and 56 to ride over as the wrapped palletized loads are carried away from outfeed conveyor 131. The process of unloading multiple palletized loads with pallet truck 48 may be similar to the process for palletized load 16 in other respects.

Other embodiments of the disclosure will be apparent to those skilled in the art from consideration of the specification and practice of the invention disclosed herein. It is intended that the specification and examples be considered as exemplary only, with a true scope and spirit of the disclosure being indicated by the following claims.

What is claimed is:

1. An apparatus for transferring a load between a pallet truck and a load wrapping surface, comprising:
   an angled ramp surface having first and second sections configured to support at least a portion of the pallet truck, a top surface of the first section defining a fixed angle relative to a ground surface; and an angled conveyor surface extending alongside at least a portion of the second section of the angled ramp surface such that the angled conveyor surface is not coextensive with the first section along a conveying direction, wherein the angled conveyor surface is configured to convey the load between the load wrapping surface and the angled ramp surface.

2. The apparatus of claim 1, wherein the angled ramp surface and the angled conveyor surface are angled relative to a horizontal support surface.

3. The apparatus of claim 2, wherein the angled ramp surface and the angled conveyor surface have the same angle relative to the horizontal support surface.

4. The apparatus of claim 1, wherein the angled ramp surface is configured to support the pallet truck with a fork of the pallet truck in a non-binding position.

5. The apparatus of claim 4, wherein the angled ramp surface is configured to support at least one wheel assembly of the fork.

6. The apparatus of claim 4, wherein the angled ramp surface includes a protrusion configured to engage a bottom surface of the fork.

7. The apparatus of claim 1, wherein the angled ramp surface is configured to support a drive wheel assembly of the pallet truck.

8. The apparatus of claim 1, wherein the angled conveyor surface is outboard of the angled ramp surface.

9. The apparatus of claim 1, wherein the angled conveyor surface includes conveyor rollers configured to support and convey the load.

10. The apparatus of claim 9, wherein the angled ramp surface is located between left side rollers and right side rollers of the angled conveyor surface.

11. The apparatus of claim 9, wherein the angled ramp surface is located between left side rollers, central rollers, and right side rollers of the angled conveyor surface.

12. The apparatus of claim 11, wherein the central rollers include at least one idle roller.

13. The apparatus of claim 11, wherein the central rollers are vertically offset from the left side and right side rollers, and are configured to support a central region of a pallet at the bottom of the load.

14. The apparatus of claim 1, wherein the angled ramp surface includes a stop configured to engage a portion of the pallet truck to prevent movement of the pallet truck relative to the angled ramp surface in a first direction.

15. The apparatus of claim 1, wherein the angled conveyor surface includes a top surface of one of a roller conveyor, a drag chain conveyor, and a belted conveyor.

16. The apparatus of claim 1, wherein the wrapping surface is substantially parallel to a horizontal support surface.

17. The apparatus of claim 1, wherein the wrapping surface is substantially planar.

18. The apparatus of claim 17, further including a round off roller positioned to transition between the angled conveyor surface and the substantially planar wrapping surface.

19. The apparatus of claim 1, wherein the angled ramp surface is configured to position a bottom surface of a wheel assembly, coupled to a fork of the pallet truck, and a bottom surface of a drive wheel assembly of the pallet truck, on a plane.

20. The apparatus of claim 19, wherein the plane has an angle substantially equal to the angle of the angled conveyor surface.

21. The apparatus of claim 1, wherein an angle of the angled ramp surface relative to a horizontal support surface supporting the angled ramp surface is between approximately 2° and 4°.

22. The apparatus of claim 1, wherein the angled ramp surface has a length of approximately sixty-two inches.

23. An apparatus for transferring a load between a pallet truck and a conveyor surface, comprising:

an angled, non-conveyor portion having first and second sections and configured to support the pallet truck, a top surface of the first section defining a fixed angle relative to a ground surface; and an angled, conveyor portion configured to support the load;

wherein at least a portion of the second section of the non-conveyor portion extends at least partially into the conveyor portion such that the angled conveyor portion is not coextensive with the first section along a conveying direction;

wherein the angle of the non-conveyor portion is substantially equal to the angle of the conveyor portion at a support surface for a wheel of the pallet truck closest to the conveyor portion.

24. The apparatus of claim 23, wherein a top surface of the non-conveyor portion forms a plane.

25. The apparatus of claim 24, wherein the plane includes the support surface.

26. The apparatus of claim 23, wherein the wheel is a drive wheel assembly of the pallet truck.

27. The apparatus of claim 23, wherein the wheel is a retractable wheel assembly of a fork of the pallet truck.

28. The apparatus of claim 24, wherein the angle of the plane is substantially equal to the angle of a plane defined by a conveyor surface of the conveyor portion.

29. The apparatus of claim 23, wherein the non-conveyor portion includes a top surface including a protrusion, the protrusion being configured to engage a fork of the pallet truck.

30. The apparatus of claim 23, wherein the conveyor portion is outboard of the non-conveyor portion.

31. The apparatus of claim 23, wherein the conveyor portion includes conveyor rollers.

32. The apparatus of claim 31, wherein the non-conveyor portion is located between left side rollers and right side rollers of the conveyor portion.

33. The apparatus of claim 31, wherein the non-conveyor portion is located between left side rollers, central rollers, and right side rollers of the conveyor portion.

34. The apparatus of claim 33, wherein the central rollers include at least one idle roller.

35. The apparatus of claim 33, wherein the central rollers are vertically offset from the left side and right side rollers, and are configured to support a central region of a pallet at the bottom of the load.

36. The apparatus of claim 23, wherein the non-conveyor portion includes a stop configured to engage a portion of the pallet truck to prevent movement of the pallet truck in a first direction.

37. The apparatus of claim 23, wherein the conveyor portion includes one of a roller conveyor, a drag chain conveyor, and a belted conveyor.

38. The apparatus of claim 23, wherein the non-conveyor portion has a length of approximately sixty-two inches.

39. The apparatus of claim 24, wherein the plane forms an angle of between approximately 2° and 4° with a horizontal support surface supporting the angled, non-conveyor portion.

40. The apparatus of claim 23, wherein an angle of a plane defined by the conveyor surface of the conveyor portion relative to a horizontal support surface supporting the angled conveyor portion is between approximately 2° and 4°.

41. An apparatus for loading and unloading a conveyorized wrapping apparatus with a pallet truck, comprising:
    an angled ramp surface to be positioned on a support surface and having first and second sections, a top surface of the first section defining a fixed angle relative to a ground surface; and
    an angled conveyor surface outboard of the angled ramp surface wherein at least a portion of the second section of the angled ramp surface extends at least partially into the angled conveyor surface such that the angled conveyor surface is not coextensive with the first section along a conveying direction, and wherein the angle, with respect to the support surface, of at least a portion of the angled ramp surface configured to be contacted by one or more wheels of the pallet truck, is substantially equal to the angle, with respect to the support surface, of the conveyor surface, the angle of the angled ramp surface and the angle of the angled conveyor surface causing a fork of the pallet truck and a pallet resting on the conveyor surface to be positioned such that binding between the fork and the pallet does not occur as the fork is inserted into and extracted from holes in the pallet.

42. The apparatus of claim 41, wherein the angled ramp surface and the angled conveyor surface are angled relative to a horizontal support surface.

43. The apparatus of claim 41, wherein the one or more wheels of the pallet truck include a drive wheel assembly.

44. The apparatus of claim 41, wherein the one or more wheels of the pallet truck include a retractable wheel assembly on the fork.

45. The apparatus of claim 41, wherein the angled ramp surface includes a protrusion configured to engage a bottom surface of the fork.

46. The apparatus of claim 41, wherein the conveyor surface includes conveyor rollers.

47. The apparatus of claim 46, wherein the angled ramp surface is located between left side rollers and right side rollers of the conveyor surface.

48. The apparatus of claim 46, wherein the angled ramp surface is located between left side rollers, central rollers, and right side rollers of the conveyor surface.

49. The apparatus of claim 48, wherein the central rollers include at least one idle roller.

50. The apparatus of claim 48, wherein the central rollers are vertically offset from the left side and right side rollers, and are configured to support a central region of the pallet.

51. The apparatus of claim 41, wherein the angled ramp surface includes a stop configured to engage a portion of the pallet truck to prevent movement of the pallet truck in a first direction.

52. The apparatus of claim 41, wherein the conveyor surface includes a top surface of one of a roller conveyor, a drag chain conveyor, and a belted conveyor.

53. The apparatus of claim 41, wherein the angled ramp surface is configured to position bottom surfaces of the one or more wheels of the pallet truck on a plane.

54. The apparatus of claim 53, wherein the plane is inclined to an angle substantially equal to the angle of the conveyor surface.

55. The apparatus of claim 41, wherein the angle of the angled ramp surface with respect to the support surface is between approximately 2° and 4°.

56. The apparatus of claim 41, wherein the angle of the angled ramp surface with respect to the support surface is approximately 2.4°.

57. The apparatus of claim 41, wherein a length of the angled ramp surface is approximately sixty-two inches.

58. An apparatus for transferring a load between a pallet truck and a load wrapping surface for wrapping the load, comprising:
    an angled ramp surface configured to support at least a portion of the pallet truck;
    an angled conveyor surface extending alongside at least a portion of the angled ramp surface, wherein the angled conveyor surface is configured to convey the load between the load wrapping surface and the angled ramp surface; and
    a wrapping machine proximate the load wrapping surface, the wrapping machine including a packaging material dispenser assembly and a rotation mechanism that provides relative rotation between the load and the packaging material dispenser assembly such that packaging material is wrapped around the load.

59. The apparatus of claim 58, wherein the angled ramp surface is configured to support the pallet truck with a fork of the pallet truck in a non-binding position.

60. The apparatus of claim 59, wherein the angled ramp surface is configured to support at least one wheel assembly of the fork.

61. The apparatus of claim 59, wherein the angled ramp surface includes a protrusion configured to engage a bottom surface of the fork.

62. The apparatus of claim 58, wherein the angled ramp surface is configured to support a drive wheel assembly of the pallet truck.

63. The apparatus of claim 58, wherein the angled conveyor surface is outboard of the angled ramp surface.

64. The apparatus of claim 58, wherein the angled conveyor surface includes conveyor rollers configured to support and convey the load.

65. The apparatus of claim 64, wherein the angled ramp surface is located between left side rollers and right side rollers of the angled conveyor surface.

66. The apparatus of claim 64, wherein the angled ramp surface is located between left side rollers, central rollers, and right side rollers of the angled conveyor surface.

67. The apparatus of claim 66, wherein the central rollers are vertically offset from the left side and right side rollers, and are configured to support a central region of a pallet at the bottom of the load.

68. The apparatus of claim 58, wherein the angled ramp surface includes a stop configured to engage a portion of the pallet truck to prevent movement of the pallet truck relative to the angled ramp surface in a first direction.

69. The apparatus of claim 58, wherein the angled conveyor surface includes at least one of a top surface of one of a roller conveyor, a drag chain conveyor, or a belted conveyor.

70. The apparatus of claim 58, wherein the wrapping surface is substantially planar and where the apparatus further includes a round off roller positioned to transition between the angled conveyor surface and the substantially planar wrapping surface.

71. The apparatus of claim 58, wherein the angled ramp surface is configured to position a bottom surface of a wheel assembly, coupled to a fork of the pallet truck, and a bottom surface of a drive wheel assembly of the pallet truck, on a plane.

72. The apparatus of claim 71, wherein the plane has an angle substantially equal to the angle of the angled conveyor surface.

73. The apparatus of claim 58, further comprising a drive device that moves the load from the angled conveyor surface to the load wrapping surface and stops the movement when the load is adjacent the wrapping machine, thereby allowing the load to be wrapped by the wrapping machine.

74. The apparatus of claim 73, wherein the drive device is further configured to move the load from the load wrapping surface further along the assembly in the conveying direction after the load is wrapped by the wrapping apparatus.

75. The apparatus of claim 58 wherein the angled ramp surface and the angled conveyor surface provide a clearance space between a bottom portion of tines of the pallet truck and the bottom portion of a pallet when the pallet is on the angled conveyor surface.

76. The apparatus of claim 58, wherein the angled ramp surface is angularly fixed relative to the angled conveyor surface.

77. The apparatus of claim 58, further comprising a non-angled conveyor surface extending distally from the angled conveyor surface, wherein the load wrapping surface is disposed along the non-angled conveyor surface.

78. The apparatus of claim 1, wherein the angled ramp surface is angularly fixed relative to the angled conveyor surface.

79. The apparatus of claim 1, further comprising a non-angled conveyor surface extending distally from the angled conveyor surface, wherein the load wrapping surface is disposed along the non-angled conveyor surface.

80. The apparatus of claim 79, wherein the non-angled conveyor surface is substantially parallel to a ground surface.

\* \* \* \* \*

UNITED STATES PATENT AND TRADEMARK OFFICE
CERTIFICATE OF CORRECTION

| | | |
|---|---|---|
| PATENT NO. | : 8,979,466 B2 | Page 1 of 1 |
| APPLICATION NO. | : 12/729942 | |
| DATED | : March 17, 2015 | |
| INVENTOR(S) | : Lancaster, III et al. | |

It is certified that error appears in the above-identified patent and that said Letters Patent is hereby corrected as shown below:

In the Specification

Col. 6, Line 1 - "photograph" should be replaced with --view--

Col. 6, Line 10 - "photograph" should be replaced with --view--

Col. 18, Line 49 - "131a" should be --131 a--

Signed and Sealed this
Sixteenth Day of February, 2016

Michelle K. Lee
*Director of the United States Patent and Trademark Office*